July 19, 1955  J. F. JOY  2,713,414
SHAKER CONVEYING APPARATUS
Filed April 10, 1948  12 Sheets-Sheet 1
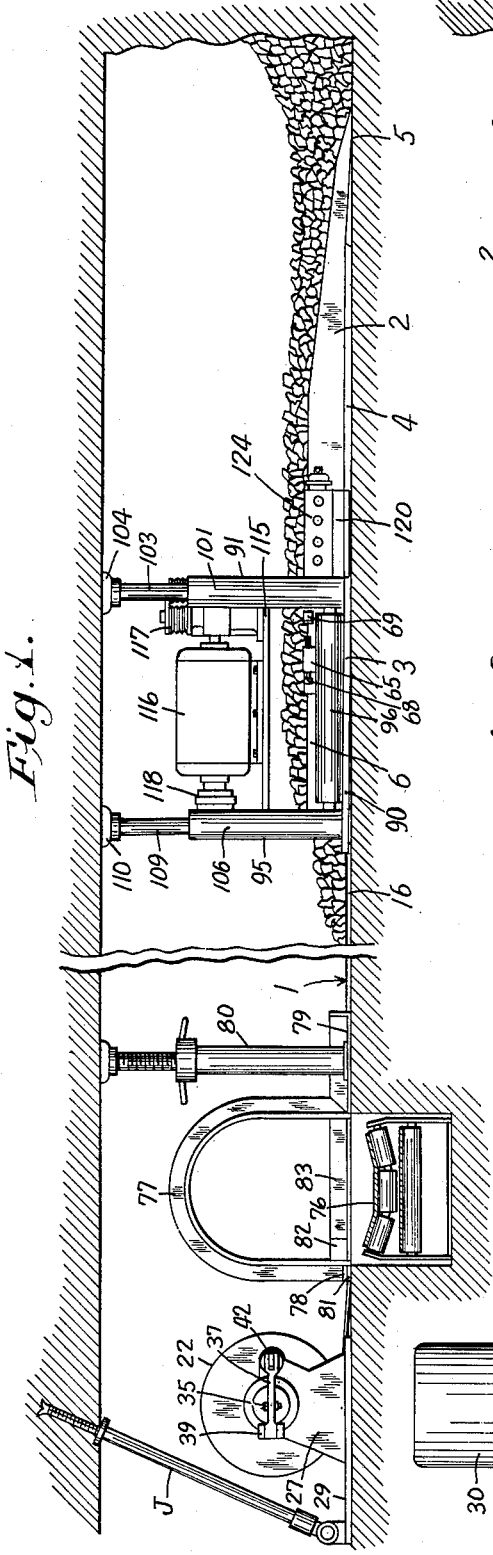
Inventor.
Joseph F. Joy.
By Louis A. Maxon
Atty.

July 19, 1955   J. F. JOY   2,713,414
SHAKER CONVEYING APPARATUS
Filed April 10, 1948   12 Sheets-Sheet 2
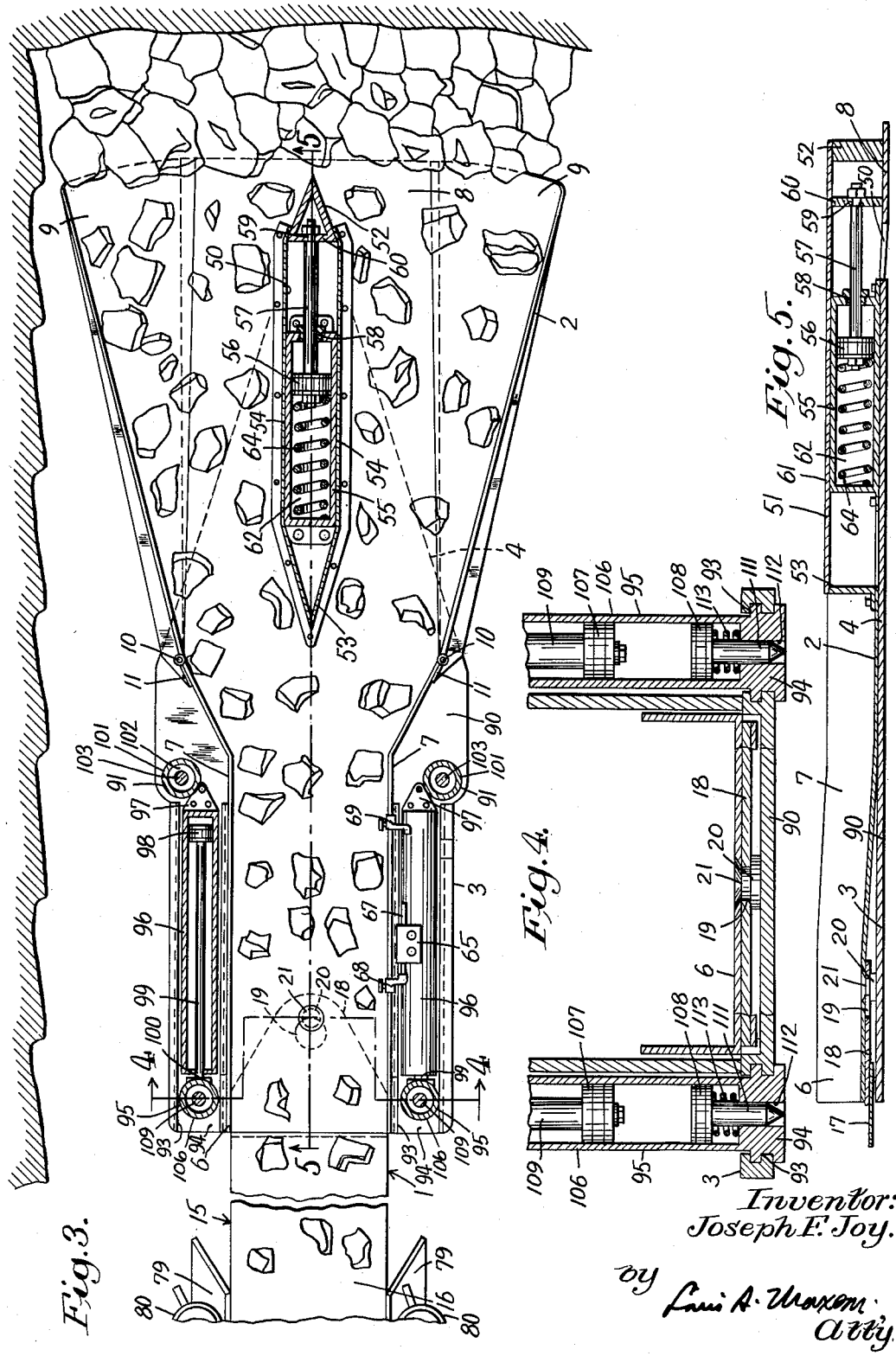
Inventor:
Joseph F. Joy.
by Louis A. Maxon
Atty.

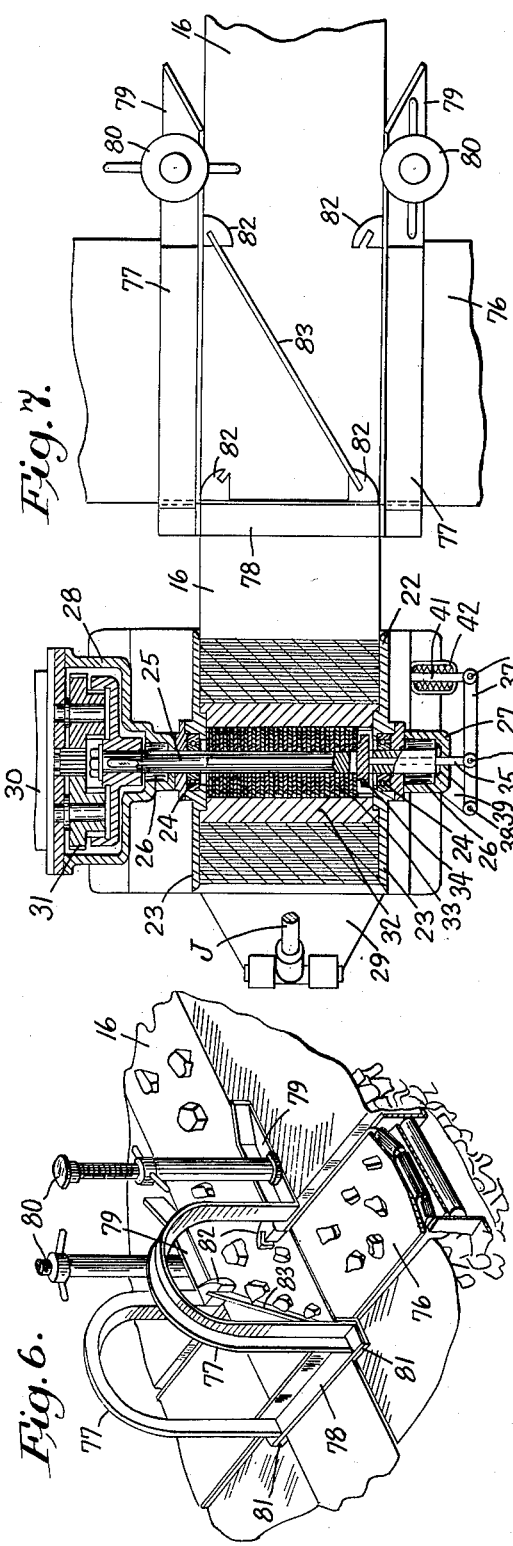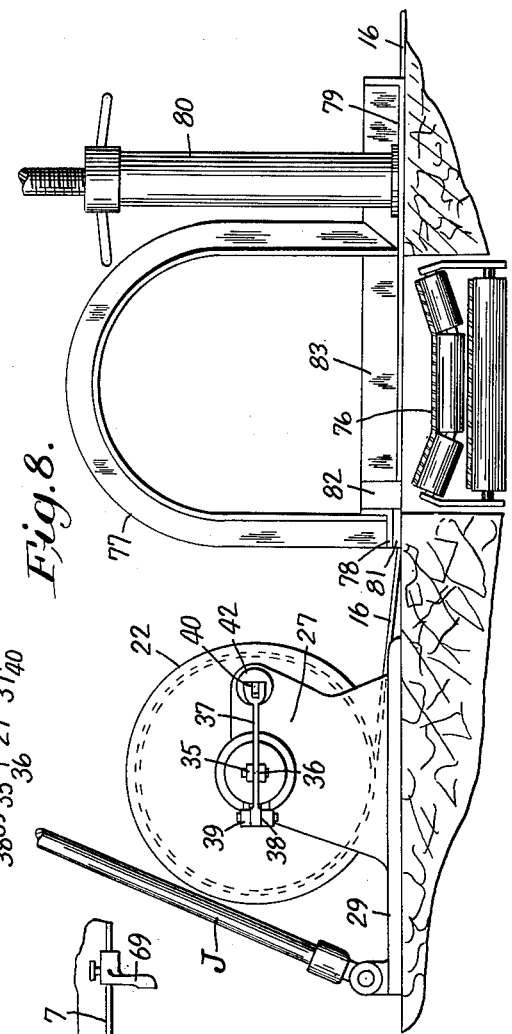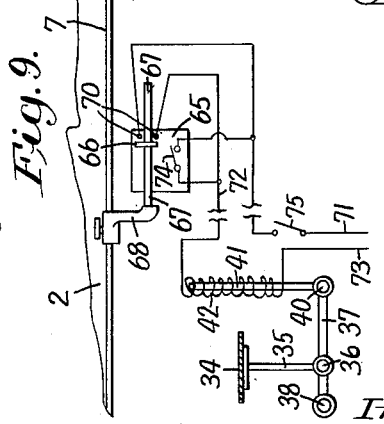

July 19, 1955  J. F. JOY  2,713,414
SHAKER CONVEYING APPARATUS
Filed April 10, 1948  12 Sheets-Sheet 4
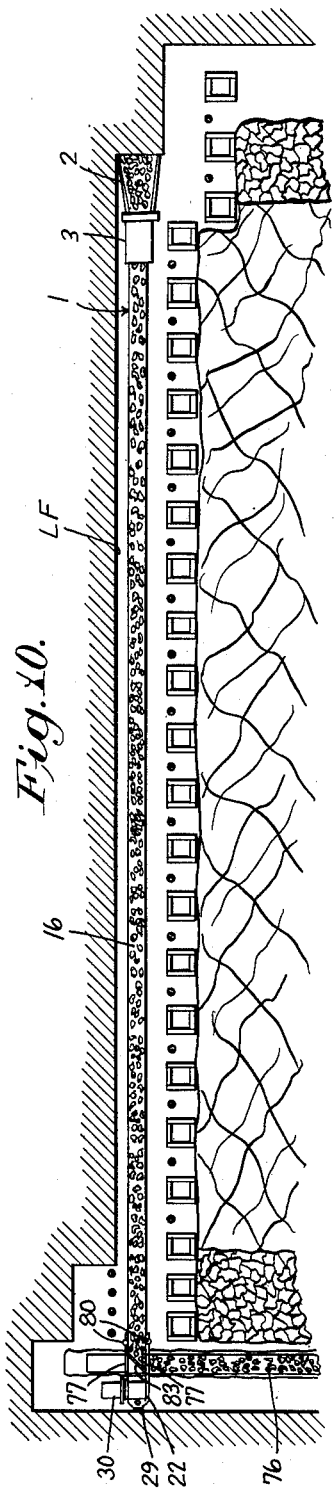
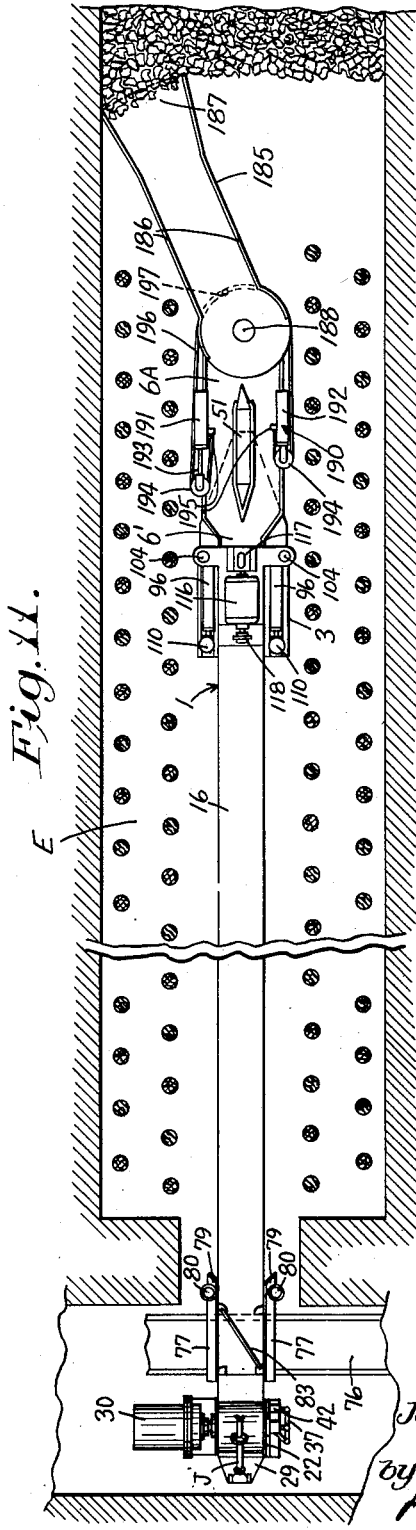
Inventor:
Joseph F. Joy.
by
Atty.

July 19, 1955 — J. F. JOY — 2,713,414
SHAKER CONVEYING APPARATUS
Filed April 10, 1948 — 12 Sheets-Sheet 5
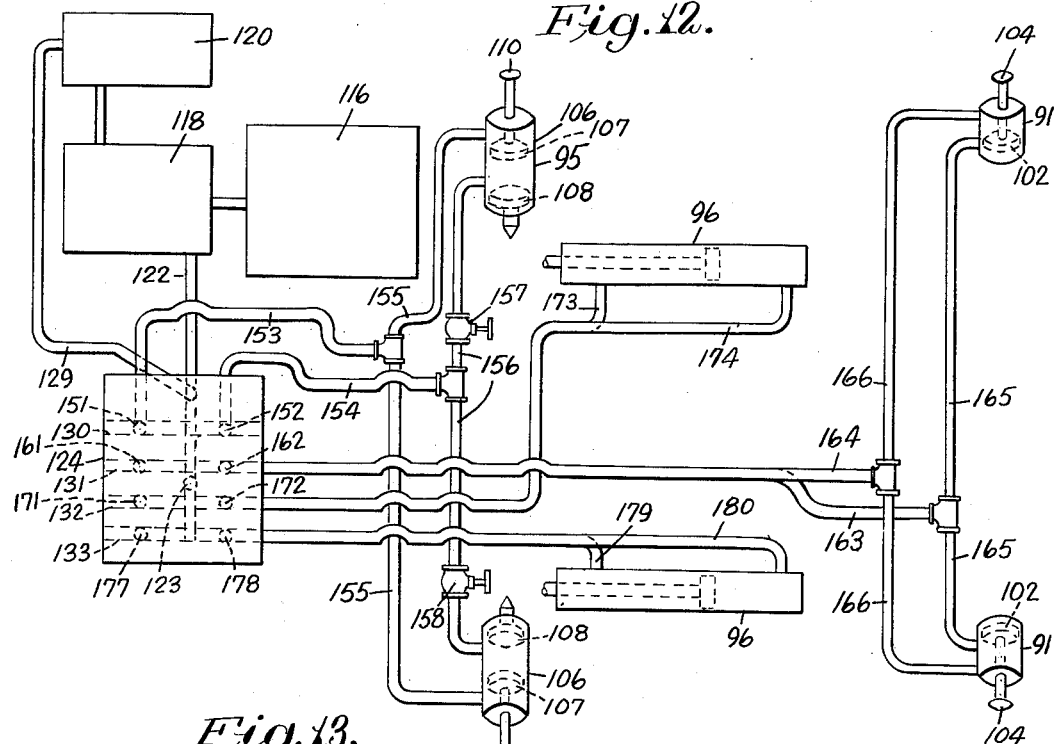
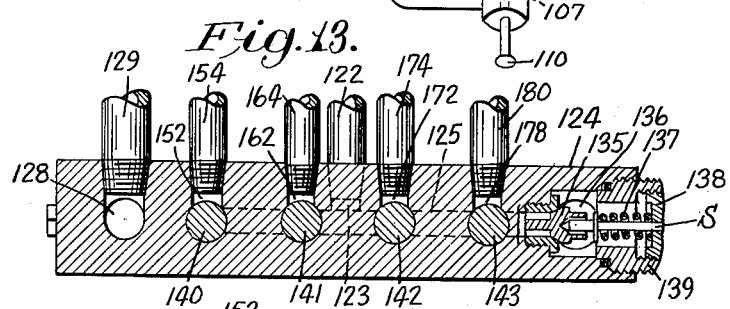
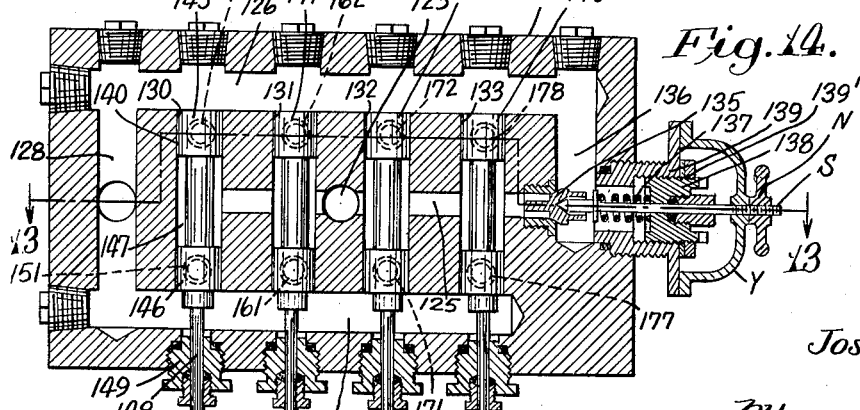
Inventor:
Joseph F. Joy July 19, 1955      J. F. JOY      2,713,414
SHAKER CONVEYING APPARATUS
Filed April 10, 1948      12 Sheets-Sheet 6
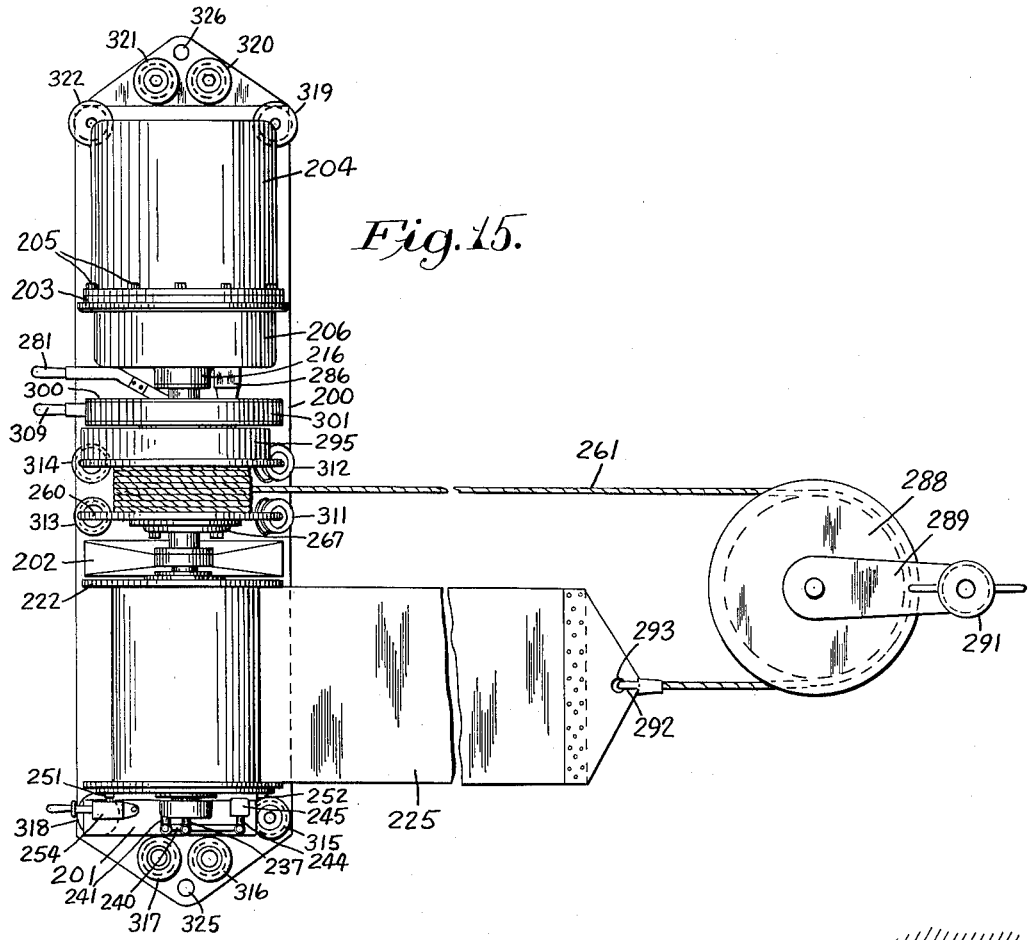
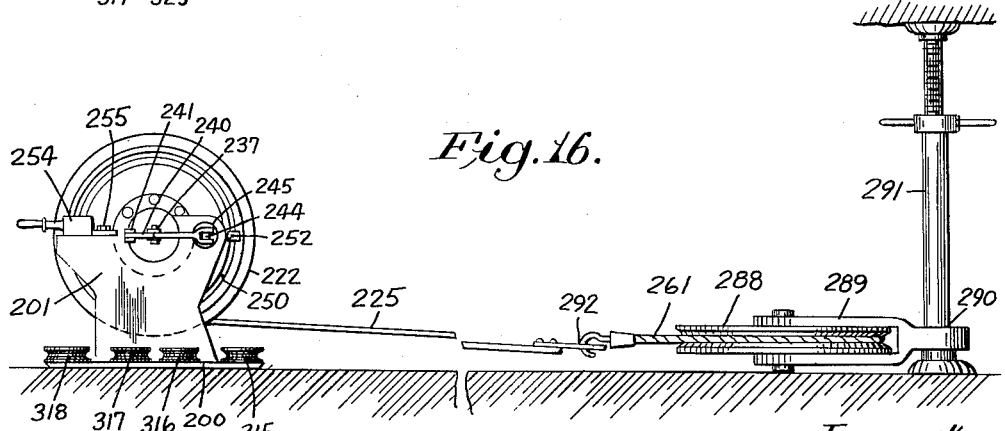
Inventor:
Joseph F. Joy.
by Louis A. Maxon.
Atty.

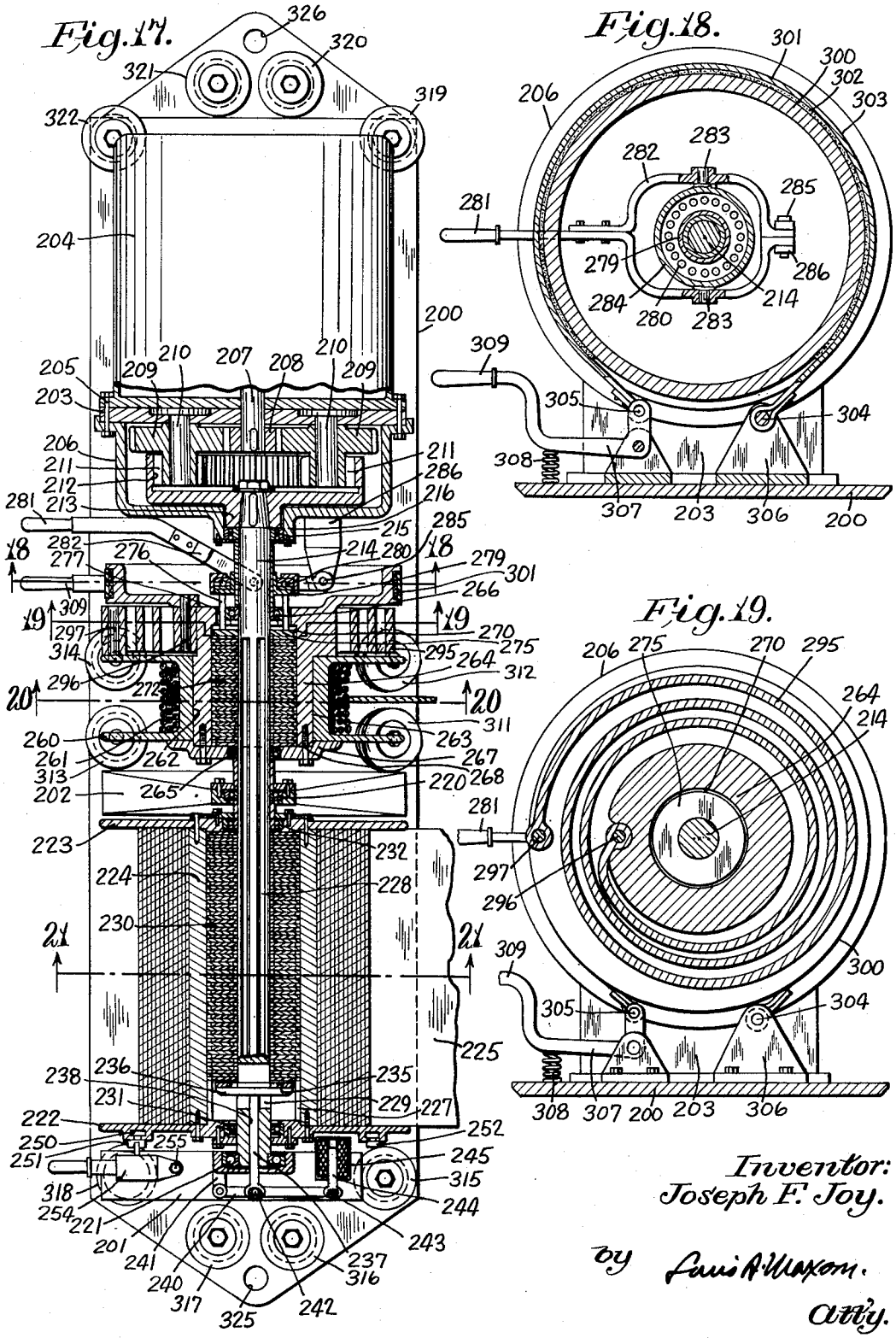

July 19, 1955  J. F. JOY  2,713,414
SHAKER CONVEYING APPARATUS
Filed April 10, 1948  12 Sheets-Sheet 8
Fig. 20.
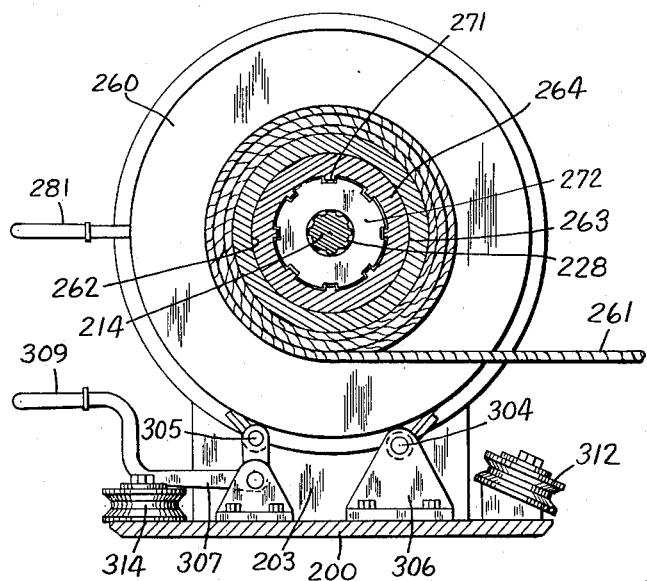
Fig. 21.
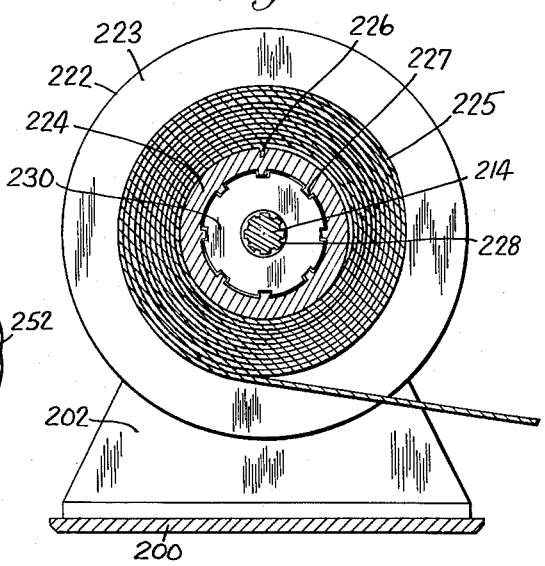
Fig. 22.
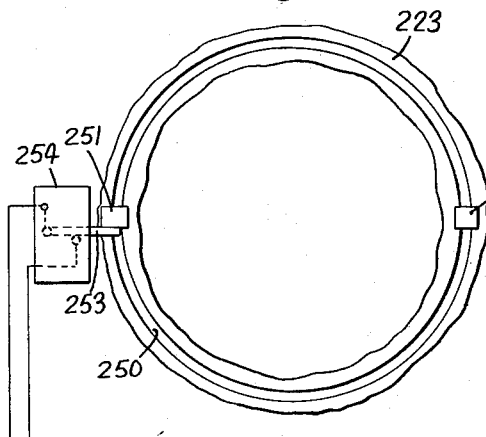
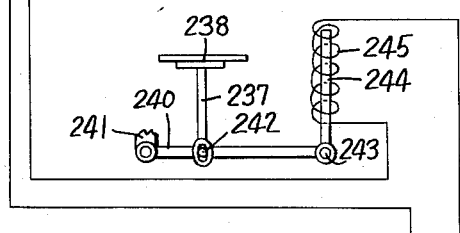
Inventor:
Joseph F. Joy.
by Lewis A. Maxson
Atty.

July 19, 1955   J. F. JOY   2,713,414
SHAKER CONVEYING APPARATUS
Filed April 10, 1948   12 Sheets-Sheet 9
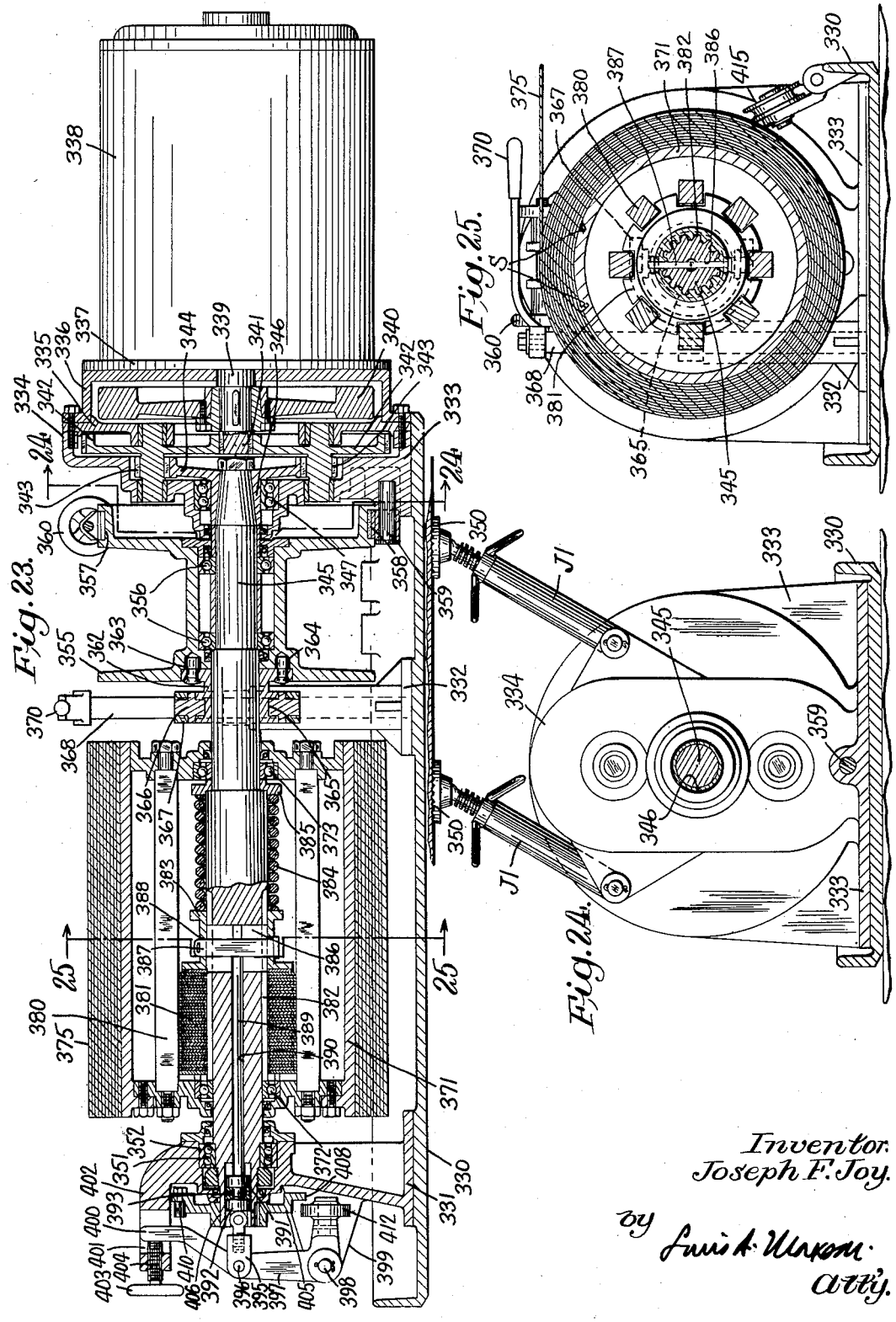
Inventor.
Joseph F. Joy.
by
Atty.

July 19, 1955  J. F. JOY  2,713,414
SHAKER CONVEYING APPARATUS
Filed April 10, 1948  12 Sheets-Sheet 10

Inventor:
Joseph F. Joy.
by Anis A. Maxon
Atty.

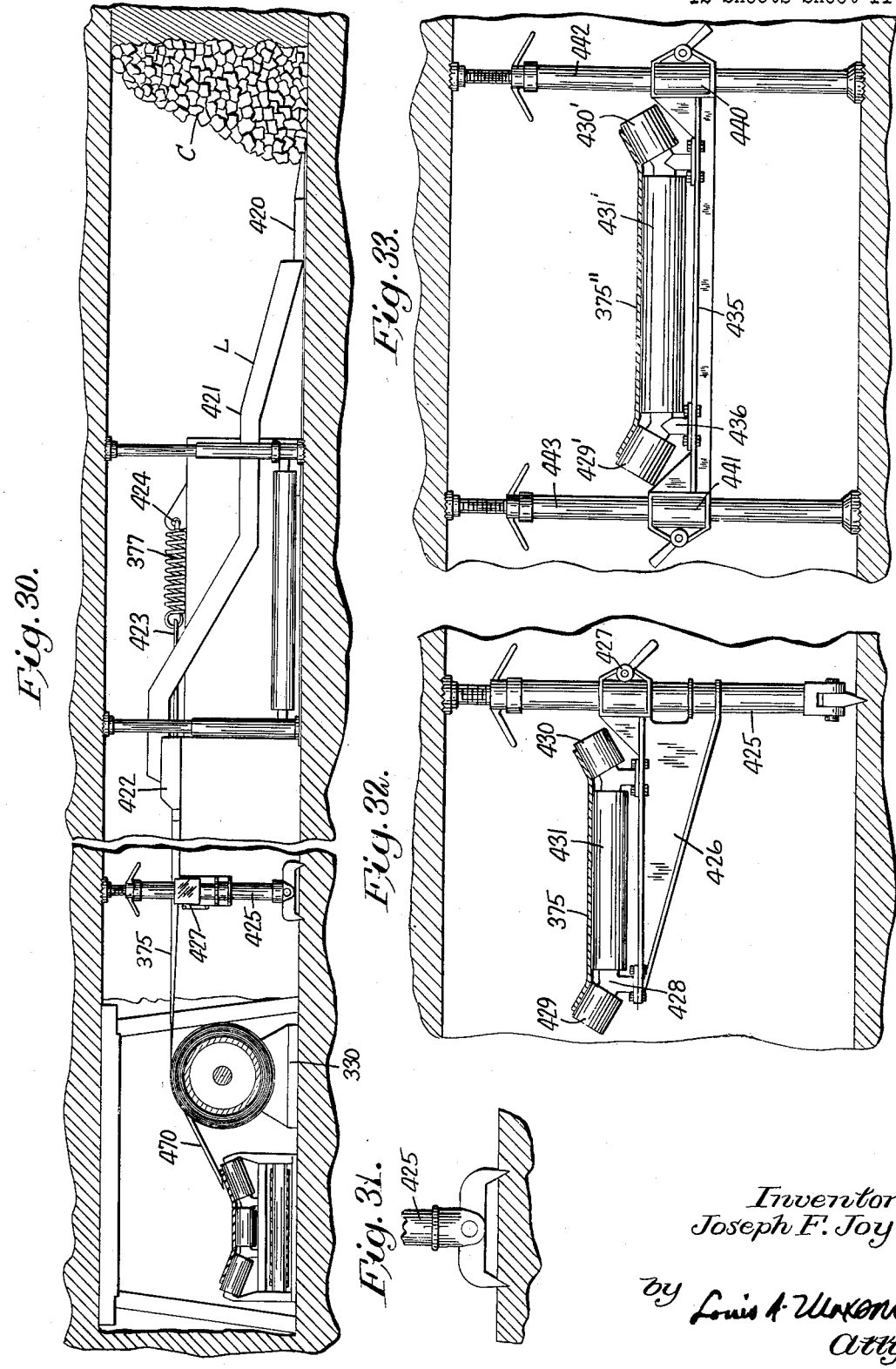

July 19, 1955  J. F. JOY  2,713,414
SHAKER CONVEYING APPARATUS
Filed April 10, 1948  12 Sheets-Sheet 12
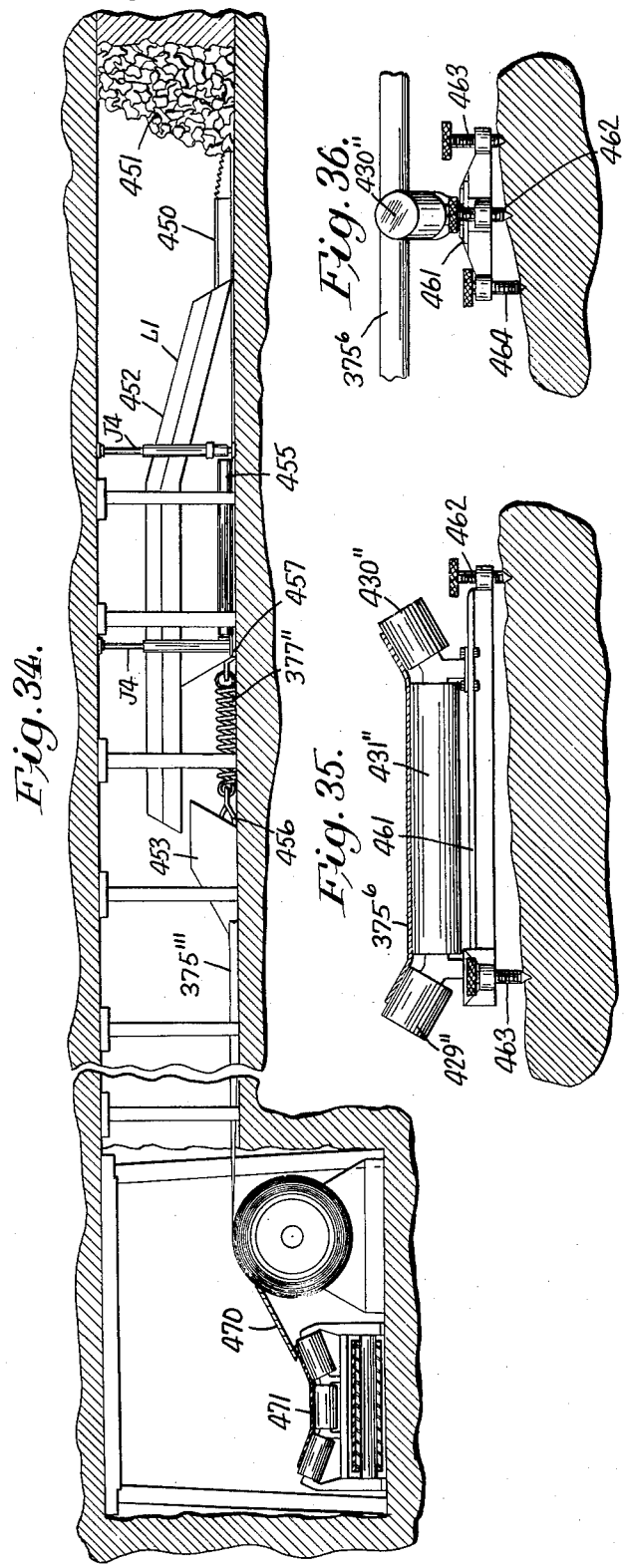
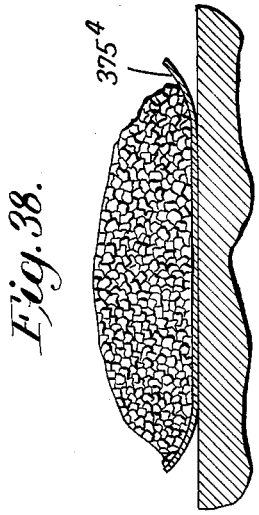
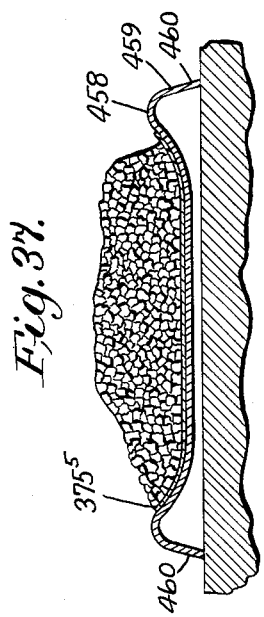
Inventor:
Joseph F. Joy.
by Faris A. Maxson
atty.

United States Patent Office 2,713,414
Patented July 19, 1955

2,713,414

SHAKER CONVEYING APPARATUS

Joseph F. Joy, Pittsburgh, Pa., assignor to Joy Manufacturing Company, Pittsburgh, Pa., a corporation of Pennsylvania Application April 10, 1948, Serial No. 20,252

7 Claims. (Cl. 198—220)

My invention relates to conveying apparatus, and more particularly to shaker conveying apparatus.

Shaker conveyor systems frequently include pan lines having an end on to which coal or other material is loaded and having at or near the other end thereof devices for imparting to the pan line alternate sharply accelerated movements in one direction and slower and more uniform movements in the opposite direction, and the reciprocation of the pan line is adapted to effect the movement of the material thereon along the pan line by reason of the fact that the material tends to move with the pan line as the latter is moved with the relatively slow and uniform motions, whereas when the pan line is moved with the sharply accelerated motions in the opposite direction, it is slid beneath the material, which does not have its direction of travel reversed thereby, with the result that the coal is moved, in a series of steps, progressively towards a desired point of discharge. In view of the fact that the steps may be caused to take place many times a minute, a relatively rapid movement of quite large quantities of material can be effected.

While there exist shaker conveyor systems in which, through the use of suitable loading devices at the end nearest a working face, it is possible to load material on to the pan line for movement thereby to a relatively remote point of delivery, extensions of the pan lines of these systems involve the addition of new pan sections at relatively frequent intervals, and I am aware of no commercial installation in which a shaker operated conveyor trough or its equivalent can be extended in any desired increments without intermittent shut-downs for the purpose of adding new pan sections. I am also aware of no installation in which a flexible conveyor belt extensible in any desired increments of length is operated by a shaker drive mechanism or its equivalent.

It is an object of my invention to provide an improved shaker conveyor apparatus. It is another object of my invention to provide an improved shaker conveyor apparatus employing a flexible conveyor belt, band or strip and improved means for the extension thereof. It is still another object of my invention to provide an improved shaker conveyor apparatus utilizing a flexible conveyor belt and having power operated means for advancing its load receiving end as a loading out process progresses. It is still another object of my invention to provide an improved shaker conveyor mechanism having improved means for effecting the relatively rapidly accelerated movements thereof. It is yet another object of my invention to provide an improved shaker conveyor apparatus having improved means for controlling the length of the reciprocatory movements thereof. It is yet a further object of my invention to provide an improved shaker conveyor system in which the material moving element is extensible by power in any desired increment by means located adjacent the actuating means for said element. It is still a further object of my invention to provide an improved shaker conveyor system in which the material moving element is extensible by power in any desired increment by means utilizing the same source of power as said actuating element. Still another object of my invention is to provide an improved extensible shaker conveyor system in which an improved operating apparatus is incorporated, including coaxial extension and drive means. Another object of my invention is to provide an improved supporting arrangement for a flexible conveyor element driven with a shaker motion. Still another object of my invention is to provide an improved shaker conveyor system having improved means for supporting the material transporting element at a level above the mine bottom. A further object of my invention is to provide an improved shaker conveyor driving mechanism having improved stroke-varying means incorporated therein. Still another object is to provide an improved extensible shaker conveyor system in which resilient means is employed for the effecting of the non-material-moving motions of the flexible conveyor element and in which, in different embodiments, such elements may be located, either at the shaker drive or at the face or other loading point, and yet be varied in their action from the drive mechanism's location. Still another object of my invention is to provide an improved shaker conveyor drive having improved means for shifting its position. Still a further object is to provide an improved shaker conveyor having improved means for selectively adjusting the length of the conveyor element and its rate of movement. Another object is to provide an improved material loading apparatus wherein extensible conveying means is attached to a loading head or mining machine and so constructed that the forward feeding mechanism of the head or machine is employed to extend the conveying means, and the conveying means, as it is retracted, is employed to retract the head or machine. Yet another object is to provide a loading apparatus wherein a conveyor belt is wound on a power driven drum and with the belt attached to a mining or loading head, so that the forward feeding mechanism of the head or machine may effect unwinding of the belt from the drum, and the drum may effect winding in of the belt to effect retraction of the head or machine. Other objects and advantages of my invention will hereinafter more fully appear.

In the accompanying drawings, in which for purposes of illustration a number of illustrative embodiments of the invention have been shown, Fig. 1 is a side elevational view of a coal gathering and conveying system constructed in accordance with one illustrative embodiment of the invention and showing the apparatus in operating position in a mine.

Fig. 2 is a top plan view of the apparatus shown in Fig. 1.

Fig. 3 is an enlarged view partially in plan and partially in horizontal section, illustrating the forward scoop of the conveying means and the means for effecting its advancing and retracting movements.

Fig. 4 is an enlarged fragmentary vertical sectional view taken substantially on the plane of the lines 4—4 of Fig. 3.

Fig. 5 is a view in central longitudinal vertical section taken substantially on the line 5—5 of Fig. 3 through the gathering mechanism of the conveying apparatus.

Fig. 6 is a perspective view showing a construction used for directing the coal or other material from the shaking or jigging conveyor on to a main entry conveyor.

Fig. 7 is a view partially in plan and partially in horizontal section, illustrating the conveyor driving means.

Fig. 8 is a side elevational view of the structure shown in Fig. 7, with the main conveyor shown in cross section.

Fig. 9 is a somewhat diagrammatic view showing the control means and associated control connections used in effecting the operation of the shaker or jigging conveyor.

Fig. 10 is a diagrammatic view in horizontal section showing the conveyor in working position along a longwall coal face and discharging into a main entry conveyor.

Fig. 11 is a diagrammatic view in horizontal section on a somewhat larger scale than Fig. 10, showing the conveyor in operative position in a room, and showing a modified loading head with the associated conveyor discharging into a main entry conveyor.

Fig. 12 is a diagrammatic view illustrating the hydraulic system.

Fig. 13 is a vertical sectional view taken substantially on the line 13—13 of Fig. 14, illustrating the control valve mechanism of the hydraulic system, with parts omitted.

Fig. 14 is a horizontal sectional view taken through the control valve mechanism.

Fig. 15 is a plan view of a modification of the invention in which the conveyor extending means and the conveyor actuating means are combined in a single unit.

Fig. 16 is a side elevational view of the structure shown in Fig. 15.

Fig. 17 is an enlarged horizontal section with parts shown in elevation through the extension and driving means of Figs. 15 and 16.

Fig. 18 is an enlarged vertical transverse section on the plane of the line 18—18 of Fig. 17.

Fig. 19 is an enlarged vertical transverse section on the plane of the line 19—19 of Fig. 17.

Fig. 20 is an enlarged vertical section on the plane of the line 20—20 of Fig. 17.

Fig. 21 is an enlarged vertical transverse section on the plane of the line 21—21 of Fig. 17.

Fig. 22 is a somewhat diagrammatic view illustrating the control for the actuating means—a shaker drive—of the embodiment of the invention shown in Figs. 15 through 22.

Fig. 23 is a longitudinal vertical sectional view through another shaker conveyor driving and extension apparatus.

Fig. 24 is a vertical transverse sectional view on the plane of the line 24—24 of Fig. 23.

Fig. 25 is a vertical transverse sectional view on the plane of the section line 25—25 of Fig. 23.

Fig. 30 is a diagrammatic view of a system for loading and conveying coal, utilizing apparatus of the character shown in Figs. 23 to 27 in which the conveyor element proper is supported in an elevated position relative to the mine bottom.

Fig. 31 is a detail view of the foot piece of a mine jack.

Fig. 32 is a side elevational view of a conveyor belt idler supporting means and of the mine jack for supporting the belt idler mechanism.

Fig. 33 shows a plural jack support for belt conveyor idlers.

Fig. 34 is a view somewhat similar to Fig. 30 showing a system in which a conveyor belt is guided and supported close to the mine bottom.

Fig. 35 is a transverse section through a conveyor belt supporting means using idler rollers.

Fig. 36 is an end view of the structure shown in Fig. 35.

Fig. 37 shows a sliding type of support for a conveyor belt.

Fig. 38 shows a loaded conveyor belt slidable directly on the mine bottom.

Figure 26:
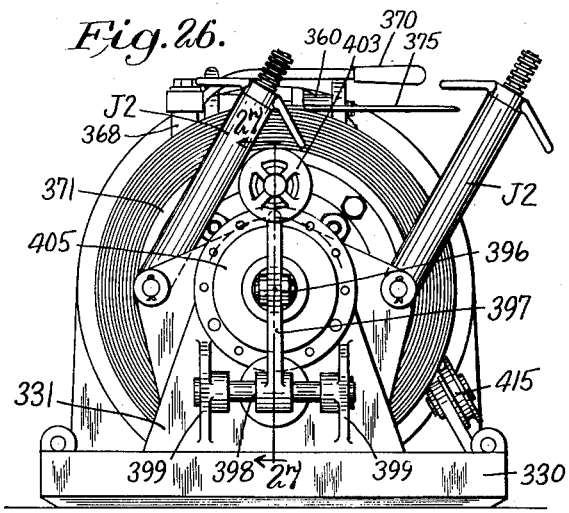
Fig. 26 is a left hand end view of the apparatus shown in Fig. 23.
Figure 27:
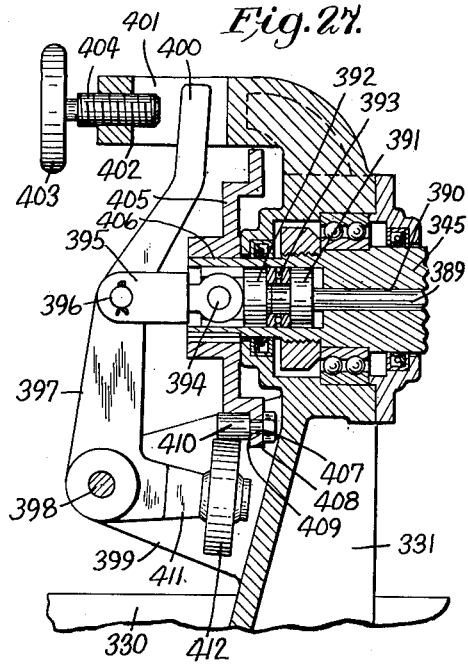
Fig. 27 is an enlarged vertical sectional view on the plane of the line 27—27 of Fig. 26, showing details of the control for the shaker drive.
Figure 28:
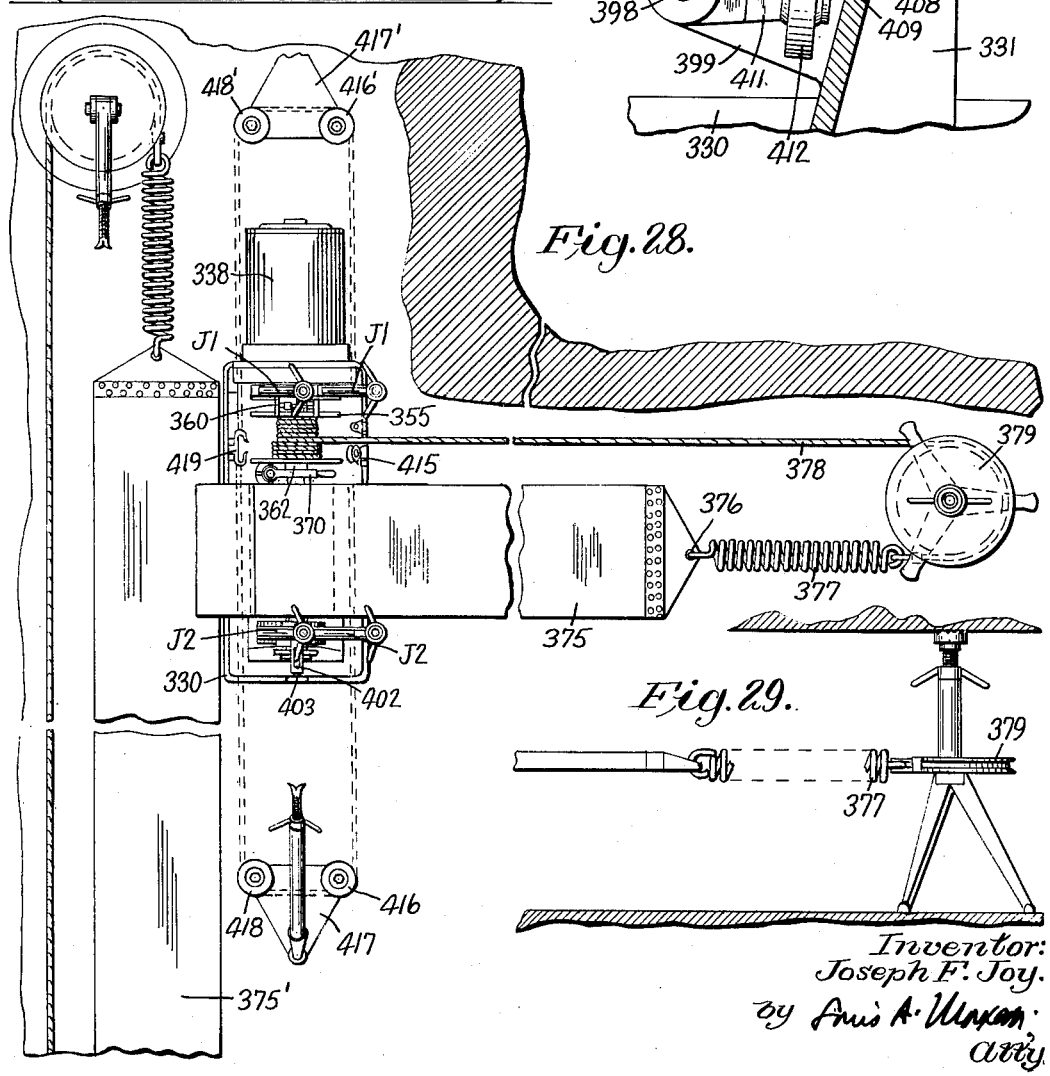
Fig. 28 is a plan view showing a mechanism of the character shown in Figs. 23 to 27 in working position in a mine.
Figure 29:
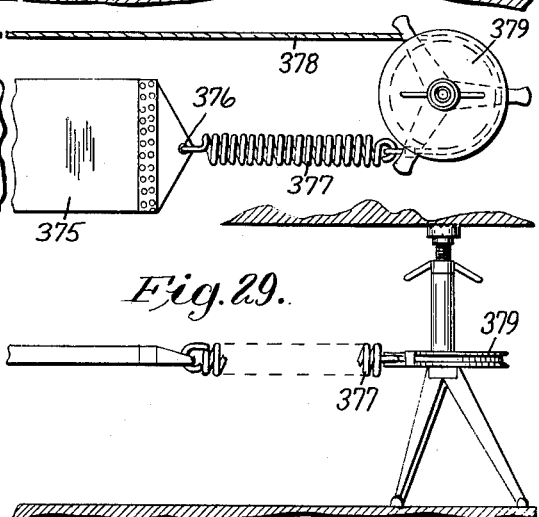
Fig. 29 is a side view of the direction changing device shown in Fig. 28.

Now referring to the drawings, and first to Figs. 1 to 14 thereof, there will be observed in these figures a conveyor mechanism generally designated 1. This conveyor mechanism is of the type known as a shaker or jigging conveyor. As will be appreciated as the description proceeds, this mechanism includes components which may be used in conveyor means of other types. The improved conveyor means 1 comprises a material receiving and directing scoop 2, and this scoop is arranged centrally with respect to a supporting base 3, and the base 3 has a forwardly projecting, forwardly tapering plate portion 4 which underlies the scoop 2. The scoop 2 is slidably guided for reciprocatory motion on the top of the base plate 4, with its forward end preferably slidably supported as at 5 on the mine floor in advance of the base 3. The scoop 2 may well be formed of sheet metal having certain inherent flexibility, and is shown as provided at its rearward end with a straight delivery section 6 provided with upstanding sides or sideboard portions 7, 7 for directing the coal gathered by said scoop rearwardly along said scoop above the base 3 and to the portions of the conveyor means more fully later described. The forward portion of the scoop 2 includes a central section 8 and a pair of side or wing portions 9, 9. The portions 9, 9 are hinged at 10, 10 to the forward central scoop portion 8 for horizontal swinging, so that these side portions may be slid inwardly towards each other to reduce the lateral dimension of the scoop, thereby to make possible extreme compactness and bring them substantially within the width of the base 3. In the construction illustrated, the bottoms of the hinged portions 9, 9 of the scoop overlie the central scoop portion 8, and at their rear ends are provided with projections 11 which engage the upstanding side walls 7, 7 when the side portions 9 are in their most widely spread positions, so that outward swinging movement of said side portions is limited.

The conveyor means includes in addition to the scoop a shaker or jigging conveyor proper generally designated 15, which comprises a flexible band—as illustrated a flexible steel band 16, the forward end 17 of which is secured as by riveting to a reinforcing plate 18. This plate may be releasably attached in any suitable manner to the reciprocatory scoop 2 and herein is formed with a suitable keyhole aperture 19 for receiving the head 20 of a rivet 21 secured to the rearward portion of the reciprocatory scoop 2. By means of this keyhole aperture in the reinforcing plate of the conveyor band, the latter may be detachably secured to the scoop and may be readily detached from the scoop when desired. The reinforcing plate 18 and the forward portion 17 of the conveyor band are arranged horizontally beneath the top of the base 3 and beneath the rear or discharge end of the scoop 2 so that the dislodged coal moved rearwardly along the scoop is discharged onto the conveyor band. The conveyor band 16 extends rearwardly from the base 3, and may for example extend along the mine floor in parallelism with a longwall face LF as shown in Fig. 10, or approximately down the center of a room or entry E, as shown in Fig. 11. The rear end of the conveyor band is secured to and wound upon a drum 22 which has side flanges 23 to confine the wound portion of the conveyor band on the drum. The winding drum is suitably journaled by means of bearings 24 on a shaft 25, which shaft is rotatably supported as by roller bearings 26 in end brackets 27 and 28. These end brackets are secured to a base 29 and an anchor jack J is pivotally connected to the base and is engageable with the mine roof firmly to hold the winding or driving drum mechanism in a stationary position. The winding or driving drum is shown as driven by an electric motor 30 flange mounted on the bracket 28, and the motor is connected through speed reducing gearing 31 to the shaft 25. The drum 22 has a hollow hub portion 32 and cooperating friction clutch plates or discs 33 are secured, some to the shaft 25 and some to the drum hub 32, so that the drum may be connected to the shaft by the loading of the friction clutch discs, while it may be disconnected from the motor by relieving the pressure on the clutch discs. As shown in Fig. 7, the clutch plates may be engaged by means of a pressure plate 34 which is adapted to be moved to clutch applying position by means of an operating rod 35 which may be moved by means shortly to be described to cause the plate 34 forcibly to press the clutch discs together. The operating rod 35 is pivotally connected at 36 to a lever 37 which is in turn pivotally connected at 38 to an arm 39 projecting outwardly from the bracket 27. The opposite end of the lever 37 is pivotally connected as at 40 to an armature 41 associated with a solenoid 42, which is also suitably mounted on the bracket 27. When the solenoid 42 is energized, the armature 41 is drawn inwardly of the coil, causing the lever 37 to move the operating rod 35 so as to cause the plate 34 to press forcibly against the end one of the clutch plates 33, and forcing of the clutch plates 33 together effects connection of the drum to the drive shaft 25, thereby effecting drum rotation in a direction to wind in the conveyor band 16. Deenergization of the solenoid effects release of the pressure on the discs 33, and thus interrupts the driving connection between the winding drum 22 and the drive shaft 25. If desired, suitable spring means (not shown) may be used to cause disengagement of the clutch plates from driving relation to each other.

Referring now particularly to Figs. 3 and 4, it will be noted that secured to the forward portion of the central section 8 of the scoop 2 and in overlying relation to a longitudinal slot 50 therein is an upstanding guide member 51 which is generally wedge-shaped in plan, having pointed or tapered front and rear ends 52 and 53, the latter shown as formed integral with, and the former as welded to, the guide member; and coal or other material received by the reciprocatory scoop 2 may move along the scoop relatively freely past the guide member because of its pointed ends. This guide member 51 is guided for reciprocatory movement along the opposite guide surfaces 54 formed on the sides of a horizontal cylinder member 55 which extends longitudinally of the scoop and through the opening 50 therein and is suitably rigidly secured to the underlying plate portion 4 of the base 3. The cylinder 55 is a fluid cylinder preferably of the air type, and contains a reciprocatory piston 56 having a piston rod 57 projecting forwardly through a suitable gland 58 carried by the front cylinder head. The forward end of the piston rod is rigidly attached at 59 to a transverse plate 60 integral with the front tapered portion 52. A shield 61, preferably of sheet steel, covers the cylinder 55 and is fixed to the top of the guide member 51 for providing protection against damage by falling coal. The rear portion 62 of the cylinder 55 is charged with air under pressure by any suitable means. It is herein contemplated to use an air valve such as is used on automobile inner tubes, or the like, and to charge the cylinder by means of a hand pump, by bottled gas under pressure, or a power driven air compressor. If desired, a pressure indicator (not shown) may be mounted on the cylinder to indicate the pressure of the air within the rear cylinder portion 62 or such indicator may be associated with the charging means. Suitable access means through the shield 61 to the pressure supply connection and pressure indicator would of course be provided. The structure thus described for all practical purposes constitutes an air spring whose strength may be adjusted by increase or decrease of the air pressure according to load requirements, which will vary according to the length of the conveyor band, the load on the conveyor band, and the slope at which the conveyor band operates. By making the pressure high enough, frequent adjustments may be avoided. Obviously cylinders of various sizes or one or more cylinders may be used to obtain the desired results. Moreover, actual springs, such as the spring 64, may be located within the cylinder 55 in a position to supplement the action of the air under pressure, and may be made of any suitable material and with any desired characteristics. And a mechanical spring, as distinguished from an air spring, can be used by itself, if desired.

Suitable control means is provided for controlling the reciprocatory or jigging movements of the scoop 2 and the conveyor band 16, and this apparatus as disclosed in the present embodiment of my invention comprises, as best shown in Figs. 3 and 9, an electric switch 65 suitably supported on the base 3 in fixed relation to the latter. The switch 65 has a reciprocable contact member 66 provided with oppositely extending operating or push rods 67. The contact member 66 will remain in either of its opposite positions unless forcibly moved therefrom, and to effect such forcible movements, spaced dogs 68 and 69 are provided, these being adjustably mounted on the adjacent side portion 7 of the reciprocatory scoop 2. Contact member 66 is adapted to make and break the electrical circuit between spaced contacts 70, and one of these contacts is connected to a conductor 71 which leads to a suitable source of current while the other contact 70 is connected by a conductor 72 to one end of the solenoid 42. The other end of the solenoid 42 is connected by a conductor 73 to the source of electric current. A manually operated switch 74, preferably of the push button type, is provided to shunt the contacts 70 so that the solenoid 42 may be continuously energized at will. A stop switch may be provided also, if desired, as at 75.

When the parts are in the relation shown in Fig. 9, the contacts 70 are about to be connected under the push of the dog 68, and, when contact is made, the solenoid 42 will be energized and the core 41 will be drawn in by the solenoid, and this motion will be transmitted to the lever 37 and by it to the push rod 35 to effect engagement of the friction clutch plates 33 to connect the drum 22 on which the conveyor band 16 is wound with the driving motor, thus causing the drum to turn in a direction to wind in the conveyor band 16. This winding movement of the conveyor band will be attended by a motion of the dog 69 towards the nearer one of the push rods 67, and after movement of the conveyor band 16 through the desired distance over the mine floor, pulling with it the scoop 2 against the opposition provided by the air cylinder 55, the contact element 66 will be moved out of engagement with the stationary spaced contacts 70 and deenergize the solenoid 42, interrupting the connection between the drum 22 and the drive shaft 25. It will be understood that the rearward movement of the conveyor band 16 and of the scoop 2 relative to the base 3 builds up a relatively high pressure in the rear cylinder end 62. The rearward movement of the conveyor band 16 is at a relatively uniform rate, the actual rate being determined by the speed of the drum driving motor 30 and the amount of reduction in the reduction gearing 31. In any event, as indicated above, when the conveyor band 16 has been wound in a predetermined amount by the drum 22 and the scoop 2 has been moved rearwardly a predetermined distance, the forward dog 69 attached to the scoop abuttingly engages the adjacent rod 67 of the control switch and moves the contact 66 to break the electrical circuit between the contacts 70, thereby effecting deenergization of the solenoid 42 and causing the friction clutch plates to be released from driving engagement, whereby the winding drum is disconnected from its drive. Immediately upon the disconnection of the winding drum 22 from its drive, the highly compressed air in the rear portion 62 of the air spring cylinder 55, and the spring 64, when one is employed (or the spring 64 alone, if it be used by itself) will cause forward motion of the piston 56 and effect movement of the scoop 2 and the conveyor band 16 at relatively rapid speed—at a speed substantially greater than the rearward movement caused by the winding in of the conveyor band on the drum—in a forward direction towards the mine face. This rapid forward movement of the scoop 2 not only effects a forcing of its forward end into the pile of material on the mine floor, but at the same time the conveyor band 16 and the scoop 2 are moved beneath and relative to the coal or other material upon them so that upon a renewed winding action of the drum 22 the coal may be moved another step towards a point of discharge.

The movement of the scoop 2 forwardly toward the face continues until the rearward dog 68 attached to the scoop engages the operating rod 67 which is disposed in its path of movement, and moves the contact member 66 to a position to establish a circuit between the contacts 70, whereupon the solenoid 42 is again energized, causing forcible engagement of the friction clutch plates 33, connecting the winding drum 22 again to its drive, and effecting drum rotation in a direction to wind in the conveyor band again. The cycle of operation described will then be repeated, and these repetitions will continue as long as there is no interruption of them. As loading progresses, the supporting base 3 is moved away from the driving drum mechanism, and hence, as indicated by the breaks in the conductors in Fig. 9, provision will be made to permit an increase in the free length of the conductors in order to maintain the necessary electrical circuits.

By the reciprocatory movement of the scoop 2 and conveyor band 16 at a relatively slow speed in a rearward direction and at a relatively high speed in a forward direction, the loose coal or other material will be jigged rearwardly on to and along the free length of the conveyor band, and as the reciprocatory movements of the scoop and conveyor band are repeated over and over, the coal or other material will be caused to travel along the scoop and rearwardly along the band toward a main entry or so called "mother" conveyor 76 which is extended, as shown in Fig. 6, transversely to the conveyor band 16 and moves in a direction toward the mine opening.

As shown most clearly in Figs. 6, 7, 8, 10 and 11, the main entry or "mother" conveyor 76, which may be of the conventional endless belt type, is disposed below the shaker conveyor band 16, perhaps in a trench formed in the mine floor. In actual mining practice it is customary, however, to remove the bottom to increase head room, and in that case a special conveyor trench would not be necessary. The loose coal moving along the conveyor band 16 is deflected on to the main belt conveyor 76 by means herein shown as comprising a pair of upright, laterally spaced, inverted U-shaped members 77 preferably formed of angle iron, one pair of adjacent legs of the member 77 being connected by a transverse angle iron 78. The opposite legs of the members 77 are outwardly bent and extended to form feet 79 which rest upon the mine floor at the opposite sides of the conveyor band 16. Conventional screw type roof jacks 80 firmly anchor the feet 79 to the mine floor and small plates 81 resting on the mine floor at the sides of the conveyor band support the transverse angle iron 78 a slight distance above the mine floor so that the conveyor band may travel freely beneath the same. The four legs of the members 77 have slotted blocks 82 secured thereto, the slots of diagonally opposite blocks being adapted to receive the ends of a vertical scraper bar 83 arranged horizontally just above the conveyor band, and this scraper bar serves to deflect loose coal or other material from the conveyor band as the latter is drawn rearwardly beneath the scraper bar, the scraper bar directing the loose coal or other material laterally to effect discharge from one side of the conveyor band 16 onto the main belt conveyor 76. If the main belt conveyor is being caused to run in an opposite direction to that assumed, and it is desired to deflect the loose coal from the opposite side of the conveyor band 16, the scraper bar 83 may be removed from its position described and be placed in a diagonally opposite position in the slots of the other slotted blocks 82, in an obvious manner.

The structure so far described is sufficient for all the requisite functions but the progressive advancement of the forward end of the conveyor and the extension of the conveyor line as a loading out operation takes place. In the application of which this present case is a continuation-in-part, the conveyor mechanism is associated with a continuous miner construction which progressively disintegrates the face, but it will be clear that other means for extending the room or entry may be provided, means wholly independent of the conveying means, and that the conveying means may, accordingly, be independent of the apparatus by which the coal is detached from the seam and prepared for loading out. In the present illustrative embodiment of the invention, means similar to the feeding means of the application above mentioned is provided for the purpose of advancing, as is required, the forward end of the shaker conveyor apparatus. It has been noted that this mechanism includes the supporting base 3. This base includes a bottom skid 90 which rests upon and is slidable over the floor of the mine. Carried by the skid 90 near the forward end of the latter is a pair of upstanding roof jacks 91, 91. The skid 90 may be formed integral with or otherwise suitably connected to the forward extension 4. The base skid 90 is provided with a pair of longitudinally extending guideways 93, 93 along its opposite side edges in which slides 94, 94 are slidable. These slides, at their rearmost ends, support jack mechanisms 95, 95. Horizontal cylinders 96, 96 are secured, as by brackets 97, 97, to the base skid 90 and contain pistons 98 having piston rods 99 which are secured, as at 100, to the jack devices 95. It will be understood that the supply of fluid to the forward ends of the cylinders 96, if the skid 90 is held stationary, will force the jack devices 95 and the slides 94 rearwardly relative to the base and, correspondingly, that if the pistons 98 are in the forward ends of their cylinders and the jack devices 91, 91 are collapsed and the jack devices 95 hold the slides 94 against longitudinal movement, the base skid 90 can be fed forward upon the supply of fluid to the forward ends of the cylinders 96. Then, if the skid 90 is held stationary and the jack devices 95 are rendered inoperative to hold the slides stationary, a supply of fluid to the rearward ends of the cylinders 96 will enable the slides to be drawn forward again relative to the skid 90, and the parts can be repositioned for another forward feeding movement. The jack devices 91 consist simply of cylinders 101 having pistons 102 in them and projecting piston rods 103 and roof engaging ends or pads 104. Upon the admission of fluid beneath the pistons 102, the pads 104 will be forced into engagement with the roof and the skid 90 will be held against longitudinal movement. Conversely, on venting pressure from beneath the pistons 102, the skid will be freed for sliding movement on the mine bottom. The jack devices 95 are somewhat more complex, and they consist of cylinders 106 in which pistons 107 and 108 are both arranged for reciprocation. The pistons 107 have piston rods 109 extending through the upper heads of the jack cylinders and carry pads 110 which can be forced into engagement with the roof. The pistons 108 have short, pointed rods 111 extending through bores 112 in their lower heads, and springs 113 normally maintain the pistons 108 in such position that their piston rods are not in engagement with the mine bottom. Upon the supply of pressure fluid between the pistons 107 and 108, the latter pistons are forced downward to hold the slides 94 against sliding movement on the mine bottom, and the pistons 107 move the pads 110 into engagement with the roof. Thus, by supplying fluid alternatively to the jack devices 91 and 95 and to the rear and front ends of the cylinders 96, progressive advance of the forward end of the conveyor mechanism can be effected. Retraction can also be effected, obviously, by proper manipulation of the controls which will now be described.

A platform 115 is supported a substantial distance above the skid base 3 and carries an electric motor 116 which is adapted, in a suitable manner, to drive a compressor 117, herein shown as of the two-stage, air-cooled type and which is adapted to supply a fluid to the space 62, and said motor is also arranged to drive a hydraulic pump 118 which is adapted to supply hydraulic fluid to the jack mechanisms 91, 91 and 95, 95 and to the cylinders 96, 96 (see Fig. 12). The pump 118 has its intake connected to a reservoir 120 which contains a fluid, preferably a liquid such as a light oil. The pump discharge is connected by a conduit 122 to the inlet 123 of a valve mechanism 124. This valve mechanism 124 may be arranged in any suitable manner on the machine, and is herein shown as positioned above the reservoir and longitudinally of the base at one side of the latter, as shown in Figs. 1 and 2. The valve mechanism may be of any suitable construction, and, in Figs. 13 and 14, there is illustrated one form which may be used. The supply connection 122 communicates with a supply passage 125 extending longitudinally of the valve body, and parallel exhaust passages 126 and 127 extend longitudinally of the valve body at opposite sides of the supply passage 125 and communicate with a transverse exhaust passage 128 connected by a conduit 129 back to the tank or reservoir. The valve body has a series of parallel transverse bores, in this instance four in number, respectively designated 130, 131, 132 and 133, each communicating at its opposite ends with the exhaust passages 126 and 127 and intermediate its ends with the supply passage 125, this supply passage intersecting the several bores 130, 131, 132 and 133. The supply passage is closed at its left hand end, in Fig. 14, and has communication at its right hand end, upon the opening of a valve element 135, with a transverse passage 136 which communicates with the exhaust passage 126. The valve 135 normally interrupts communication between the supply passage 125 and the passage 136, and is normally held closed by a suitably loaded spring 137. The compression of the spring 137 is controlled by an adjustable follower 138 received in a plug 139 mounted in the valve casing 124. A packed lock nut 139' prevents leakage along the follower plug. The setting of the spring 137 is normally such as to hold the valve 135 seated unless a pressure in excess of the desired limit be developed in the supply passage 125. The spring pressure might be substantially completely relieved from the valve 135 by backing off the follower, but a more convenient arrangement consists in the provision of a threaded stem S with a hand wheel operated nut N which may be used to relieve the valve of seating pressure at will, the hand wheel operated nut N engaging a cross yoke Y supported by the end of the plug 139. When the pressure is relieved from the valve 135, the latter may permit the fluid to circulate freely through the valve casing without the placing of a substantial back pressure on the pump 118. In the bores 130, 131, 132 and 133 there are spool-type valves 140, 141, 142 and 143 respectively, each valve having end spools 145 and 146 and an intermediate groove 147, and each has a stem 148 extending outwardly from the valve casing 124 through suitable packing glands 149. Suitable operating handles 150 are provided for the several valves.

The bore 130 has ports 151 and 152 controlled by the valve 140, and to these ports there are respectively connected conduits 153 and 154. The conduit 153 has branches 155 extending to the spaces above the pistons 107 in the jack devices 95. The conduit 154 has branched conduits 156 connected to the spaces between the pistons 107 and 108 in the jack devices 95. Stop valves 157 and 158 are arranged in the branches 156. It will be evident that upon movement of the valve 140 in one direction from the position shown in Fig. 14, fluid may be supplied, if the stop valves 157 and 158 are both open, between the pistons 107 and 108 of both jack devices 95 and cause these pistons to move apart and to lock both slides 94 against longitudinal movability, thus establishing a condition in which rectilinear feeding movement will be effected. On movement of the valve 140 in the other direction from the position of Fig. 14, the fluid supplied between the pistons may be vented to the tank, and fluid may be supplied above the pistons 107 to force them downwardly in the cylinders 106, and the springs 113 will raise the pistons 108 in the cylinders 106. If one of the stop valves 157 or 158 is closed and the other open, when fluid is supplied to the conduit 154, angling feeding movement will be made possible, the direction of the angling feeding movement depending on which one of the stop valves is closed and which one is open. It will of course be understood that it is the supply of fluid to the cylinders 96, 96 which actually produces the feeding movements.

Associated with the bore 131 and controlled by the valve 141 are ports 161 and 162, these being connected by conduits 163 and 164 and branch conduits 165 and 166 respectively to the opposite ends of the jack devices 91. By suitably shifting the position of the valve 141, the pads 104 may be forced into firm engagement with the roof, thus jacking down the base 3, or these pads may be retracted, thus rendering the base slidable.

Fluid is supplied to the opposite ends of the feed cylinders 96, 96 under the control of the valve members 142 and 143. In order that the direction of movement of the base 3 can be controlled, separate control of the supply to the feed cylinders 96 is provided for, and the valve 142 controls the supply of fluid to the left hand one of the feed cylinders 96 looking forward, while the valve 143 controls the flow to the right hand cylinder 96, looking forward. The valve 142 controls ports 171 and 172 which are connected by conduits 173 and 174 respectively to the rear and forward ends of the left hand cylinder 96. The valve 143 controls ports 177 and 178 which are respectively connected by conduits 179 and 180 to the rear and forward ends of the right hand cylinder 96. When the left jack 95 is set and the right hand jack 95 is collapsed, and pressure is admitted to the forward end of the left hand cylinder 96, angled movement of the base 3 to the right is possible. Conversely, with the right hand jack 95 only set and the right hand feed cylinder 96 supplied with fluid ahead of its piston, angled movement to the left is possible. With the valves 157 and 158 both open, rectilinear advance and retraction are possible, in a manner that will be self-evident from what has already been said.

The general mode of operation of the improved conveying apparatus so far described is as follows. In the position shown in Figs. 1, 2 and 10, the motor driven drum mechanism associated with the conveyor band 16 is located on the gangway directly rearward of the mechanism 1 and at the remote side of the main belt conveyor 76 and with the base 29 of the winding mechanism firmly held in position by the roof jack J. The conveyor band 16 is extended from the bottom of the winding drum 22 forward across the top of the belt conveyor 76 and beneath the scraper bar 83, and the forward end of the conveyor band is attached by the keyhole slot and rivet connection 19, 21 to the rear end of the reciprocatory scoop 2 which is reciprocably connected to the base 3. The side wings 9 of the front conveyor scoop 2 may be moved to their outward wide apart position as shown in Fig. 3, and as the apparatus is fed forwardly the scoop 2 is moved toward the working face into a position wherein it digs beneath the loose coal on the mine floor and where it may receive coal dislodged from the working face, if dislodging apparatus is arranged to work simultaneously with it as in the constructions shown in my copending applications hereinafter mentioned. As the scoop is advanced toward the working face, the conveyor band 16 is extended along the mine floor by the unwinding thereof from the winding drum 22 of the winding mechanism. When it is desired to draw off a substantial length of the belt from the drum, the clutch discs 33 may be disengaged, but during normal operation, i. e. during the relatively continuous elongation of the free portion of the belt as the scoop is caused to advance through the action of the feed mechanism, no manual intervention in the automatic operation of the clutch is necessary. This may be understood by assuming that the base is advanced one inch. As the scoop moves forward during the interval when the clutch discs are not under pressure, the dog 68 which is attached to the band will have to advance one inch further before the clutch is reloaded. Thus, there will be an automatic extension of the belt one inch to compensate for the advance of the base, and this process will be repeated over and over again, it being understood that the hypothetical advance of one inch is merely so as to permit a visualization of the extension of the belt by increments. During the loading operation, the conveyor band 16 and front scoop 2 are reciprocated, moving at a relatively slow speed in a rearward direction and at a high speed in a forward direction, under the control of the automatic controlling switch 66 for the winding drum clutch 33, so that the loose coal is moved rearwardly with a shaker or jigging action. As the coal is moved rearwardly along the conveyor band 16, it reaches the main entry or gangway, and is deflected by the scraper bar 83 on to the main belt or "mother" conveyor 76. The winding drum 22 moves the conveyor rearwardly at a relatively low speed, and when the conveyor band reaches the end of its short rearward travel, the drum clutch 33 is automatically released by deenergization of the solenoid 42 under the control of the switch 66 and 70, the contact member 66 being operated by the dog 69 on the reciprocating scoop. The conveyor band is then moved rapidly forwardly by the force exerted by the air spring mechanism 55, 56, or the spring 64, or both, depending upon the structure employed; and when the conveyor band reaches the end of its forward stroke, the drum clutch 33 is again applied by the solenoid 42 under the control of the dog 68, and the automatic switch element 66, to move the conveyor band again relatively slowly rearwardly. Accordingly, during the loading operation, the conveyor is extended as need arises by the feed mechanism associated with the base 3 and is constantly shaking or jigging the dislodged coal rearwardly along the conveyor band 16 toward the main belt conveyor 76; and when the end of the face along which loading is being accomplished is reached, the gathering mechanism may be returned to its starting point either by the winding in of the conveyor band 16 on to the winding drum 22 or with this winding in action facilitated by the proper operation of the jacks and feed cylinder and piston mechanisms to move the base 3 and the parts supported on and associated therewith rearwardly.

In Fig. 11 there is shown a construction which is very similar to what has been described, but instead of having a scoop 2 fixed in alinement with a delivery portion 6 as in the first form and with a belt 16, there may be provided an inclined forward extension 6A integral with the delivery portion 6' and there may be swiveled on the front end of the extension 6A a chute 185 having a parallel walled portion 186 and a flaring material gathering chute portion 187. This structure is swiveled as at 188 on the front of the extension 6A, and hydraulic cylinder and flexible cable devices are provided for swinging the gathering chute 185 relative to the extension 6A, and for holding it at different adjusted positions. This hydraulic cylinder and flexible element structure is generally designated 190, and includes a pair of cylinder and piston mechanisms 191 and 192 fixed at opposite sides of the extension 6A. The piston rods 193 of these cylinder and piston mechanisms 191 and 192 carry sheaves 194 and flexible connections extend from stationary points 195 about the sheaves 194 and forwardly as at 196 for connection at 197 to the chute 185. This mechanism permits the chute 185 to be positioned as shown in Fig. 11, or at the opposite rib, or at any intermediate position, and to be held at a fixed angle to the axial line of the conveyor strip 16, and as the chute 185 will partake of the shaker or jigging motion of the extension 6A, it will load material from the mine bottom at any of its different adjusted angular positions. There is no need for giving a further description of the structure and mode of operation of this arrangement other than to say that the valve box which would be supplied for the control of this form of the invention would include an additional valve bore, valve, control handle, and set of conduits so that fluid could be supplied to the cylinder and piston mechanisms 191 and 192 in the necessary manner. If desired, the valve mechanism for controlling the fluid flow relative to the cylinder and piston mechanisms 191 and 192 may be constructed so as to maintain fluid entrapped in both of them.

It is of course unnecessary that the extension of the conveyor strip be effected in the manner employed in the embodiment which has been so far described, and in Figs. 15 to 22 I have shown another embodiment of the invention in its broader aspects in which the same motor which provides the power for effecting the jigging movement of the conveyor strip also provides the power for the progressive pulling out or extension of this strip as well as for its winding in when that is desired.

Referring now to Figs. 15 to 22, it will be observed that a base 200 supports thereon three upstanding pedestals 201, 202, and 203. A motor 204 is bolted as at 205 to the pedestal 203, and the bolts 205 also secure a gear casing 206 to the pedestal 203. A motor drive shaft 207 supports and rotates a pinion 208 which meshes with gears 209 turning on stub shafts 210 projecting from the pedestal 203, and each of the gears 209, which are relatively large, has fixed in coaxial relation to it a smaller pinion 211. The pinions 211 mesh with an internal gear 212 whose hub 213 is secured to the end of a shaft 214 which extends longitudinally of the base 200. The shaft has a bearing 215 in a tubular portion 216 of the gear housing 206. The shaft is also journaled as at 220 in the pedestal 202, and a further bearing 221 provides a rotatable support for the end of the shaft in the pedestal 201. A drum 222 has end flanges 223 secured to a hollow tubular portion 224, to which one end of a flexible conveyor strip 225 is secured, as shown at 226 in Fig. 21. The tubular portion 224 has internal lands as at 227, and the shaft 214 has splineways 228 extending for a considerable portion of its length. It also has a transverse slot as at 229 for a purpose later to be explained. Interleaved discs 230 are arranged between the periphery of the shaft 214 and the inner wall of the tubular portion 224 of the drum, alternate discs being held against rotation with respect to the drum by means of the lands 227 and with respect to the shaft 214 by the splineways 228. The drum 222 is rotatably supported by the shaft by bearings 231 and 232.

When the clutch discs 230 are pressed together, the shaft will transmit its rotation to the drum 222. When the clutch discs are not pressed together, the shaft may rotate without rotating the drum, and the drum may also be rotated relative to the shaft. For the purpose of pressing the clutch discs together when desired, an annular follower 235 is provided, and this is supported by a transversely extending member 236 extending through the slot 229 and supported on a push rod 237 which extends through a bore 238 in the end of the shaft 214 nearer the bottom of Figure 17. A lever 240 pivotally supported on a bracket 241 upon the pedestal 201, is pivotally connected at 242 to the push rod 237, and its outer end is pivotally connected at 243 to a plunger 244 received in a solenoid 245. Energization of the solenoid will pull the plunger into it and effect a loading of the clutch discs, and accordingly a connection of the drum 222 to the shaft 214. The means for periodically energizing the solenoid 245 is diagrammatically illustrated in Fig. 22. It will be noted, referring to Fig. 17, that the drum flange 223 nearer the bottom of the sheet has an annular groove 250 in it, and dogs 251 and 252 are adjustably mounted in the groove, which is of T slot construction. If it is desired to have the same amount of movement of the conveyor strip at times when there is a considerable amount of this strip wound on the reel or drum, and at a time when there is relatively little of the strip remaining wound on the drum, it will be evident that it will be necessary to change the position of one at least of the dogs. These dogs are adapted to cooperate with a switch arm 253 which is mounted on a swingable switch support 254 pivoted at 255 on the pedestal 201, see Figs. 16 and 17. When the switch supporting arm 254 is swung about the pivot 255 so as to remove the switch control arm 253 from the path of movement of the dogs 251 and 252, it will be evident that it will be impossible for the dogs to control the energization of the solenoid 245, but when the member 254 is swung into the position shown in Fig. 17, the switch control arm 253 will be in the paths of the dogs and the switch arm can be thrown alternately into open and closed circuits. For example, the dog 252 will open the switch and effect deenergization of the solenoid after the conveyor strip has been wound in a predetermined distance, and, when the conveyor strip has been paid out a corresponding distance, the dog 251 will engage the arm 253 and effect a reenergization of the solenoid 245 and a resultant drawing out of this strip again to such a distance as may take place before the dog 252 again engages the arm 253 and effects reopening of the switch. In order that the dog 251 may surely engage the arm 253, it may be given a somewhat greater projection than the dog 251. Desirably, the dog 251 may be made with a yield in its construction, so that it will not break the switch or move past it. Further explanation of the alternate drawing in and paying out of the conveyor strip need not be presented here in view of the similarity to operations heretofore described, but there should and will be explained the means which pulls the strip off of the belt when the removal of pressure from the discs 230 takes place and there will also be described the means for drawing out or extending the working length of the strip.

To take care of these functions, there is provided a structure which lies between the gear casing 206 and the pedestal 202. It will be observed that another drum 260 having wound on it a wire rope or cable 261 is provided. This has an internal cylindrical bearing surface 262 which is rotatably supported upon a cylindrical bearing surface 263 on a hollow member 264 which is journaled by bearings 265 and 266 on the shaft 214. It will be observed that the hollow member 264 has a head member 267 secured to it as at 268, and the bearing 265 is actually arranged between this head member and the shaft 214. The splined portion of the shaft 214 extends substantially through a hollow chamber 270 in the member 264, and this member 264 has extending longitudinally of its interior lands 271, and a series of clutch discs 272 are provided within the chamber and alternately connected to the member 264 and to the shaft 214. A plate 275 is adapted to be pressed by fingers 276 extending through openings 277 in the member 264. These fingers are adapted to be actuated together by an annulus 279 to which pressure is applied at the will of the operator through an antifriction bearing 280, by means of a lever 281 having a yoke 282 connected to trunnions 283 carried by an annulus 284, within which the antifriction bearing 280 is arranged, and the lever 281 is pivotally supported at 285 on a projection 286 from the gear casing 106. It will thus be evident that by moving the free end of the lever 281 counterclockwise in Fig. 17; the drum 260 can be clutched to the shaft 214 with the result that the drum will be caused to rotate with the shaft and will, when the shaft is turning clockwise—its normal direction of rotation—wind in the cable 261. This cable extends, as best shown in Figs. 15 and 16, about a sheave 288 carried by a yoke 289 pivotally supported at 290 on a floor and roof engaging jack 291. The cable 261 extends around this sheave and back towards the base 200, and is connected at 292 to an eye 293 arranged at the end of the conveyor strip 225. Means is provided in association with the drum 260 for exerting upon the latter constantly a winding in force. This structure is best illustrated in Fig. 19. It will be observed that a heavy spiral spring 295 surrounds the end of the hollow member 264 nearer the gear casing. The inner end of this spring is pinned at 296 to this hollow member. Its other end is pinned at 297 to the outer portion of one flange of the drum 260. The hollow member 264 has a brake drum 300, and with this brake drum there is associated a brake band 301 including a friction lining 302 and an outer metallic band 303. The opposite ends of the metallic band are connected as at 304 and 305 respectively to a stationary bracket 306 projecting upwardly from the base 200 and to a bell crank element 307 normally held by a spring 308 in a position to apply the brake band tightly to the brake drum but releasable by means of pressure applied to a lever 309. The brake band 301 is normally applied, while the clutch discs 272 are pressed into frictional engagement with each other only occasionally as the lever 281 may be manipulated to accomplish this result. The structure that has just been described may now be considered briefly on the assumption that the clutch discs 272 are not "loaded," and that the brake drum 300 and accordingly the hollow member 264 are held stationary. If a pull is applied to the cable 261, this will tend to cause the connection 297 to move counterclockwise in Fig. 19, which will mean an increase in the tension of the spring 295. The amount of tension in this spring can be varied by loading the clutch discs 272 and cause the member 264 and the connection 296 to turn in a clockwise direction, the brake band 301 being released for this purpose. When the desired tension has been imposed on the spring 295, the brake band 301 will be reapplied by the spring 308 acting on the bell crank 307, and it will be appreciated that during this change in tension of the spring 295 it will be possible to prevent the cable 261 yielding and allowing the point 297 also to move clockwise by loading the clutch discs 230.

No extended description of the mode of operation of this embodiment of the invention is necessary. Assume that the desired tension of the spring 295 has been established in the manner just described. Then by swinging the switch support 254 to position the arm 253 in the paths of travel of the dogs 251 and 252, the conveyor strip may be caused to be wound in by loading the clutch discs 230, this winding-in being attended by an increased storage of energy in the spring 295, and when the winding in is interrupted by engagement of the dog 252 with the lever 253, the increased tension of the spring 295 will cause the cable 261 to be wound in and pull the strip off of the drum 222, and, as it were, yank it beneath its load of coal or other material so that this load will be moved with a shaker action during the drum winding of the strip, but not have its travel reversed during the movements of the strip by the energy of the spring. When it is desired to advance the end of the strip remote from the drum, this can be done by causing the drum 260 to rotate in a winding direction by loading the clutch discs 272 under the control of the lever 281, with a temporary release of the brake band 301 during this adjustment. It will be understood that extension or reduction of the free length of the conveyor strip 225 will involve need to reset the tension of the spring 295, and may render repositioning of the dogs 251, 252 desirable, though by properly controlling other factors this may be unnecessary.

The platform or base 200 has a number of sheaves at its opposite ends and also a number of sheaves near its center. The central series of sheaves are four in number, the two at the side from which the cable 261 extends off are numbered 311 and 312 and are placed at an appropriate angle so that the cable can be led around them from the drum 260. The two sheaves at the opposite side of the drum are numbered 313 and 314. The four sheaves at the ends of the frame are numbered 315, 316, 317 and 318 and 319, 320, 321 and 322. These are so disposed that, if desired, the cable can be run completely around an end of the machine and then back to one or the other of the sheaves 313, 314 near the center of the machine, and thence off at a right angle, if it is desired to move the frame 200 transversely to its length and away from the jack 291. If it is desired to move the frame longitudinally in either direction, the cable can be passed around one of the inclined central sheaves, around one of the end sheaves nearest to the inclined sheave, and then around one of the central pair of sheaves at either end. Eyes 325 and 326 are provided in the base plate for jacks to hold the plate against slipping in use. Connections can be made to the eyes 325, 326 for the exertion of traction on the base if it is desired to slide the apparatus over a substantial distance by externally applied power rather than by means of the cable 261.

In the constructions so far described, there have been arrangements in which the drum which effects the working movements of the conveyor strip has worked against and stored energy in a so-called air spring and in which the drum worked against a spring mechanism generally coaxial with the drum and having spring adjusting means coaxial with the drum. It is also possible to have other arrangements, and as a third embodiment of the invention I have illustrated in Figs. 23 to 29 a construction in which the spring is placed between the end of the conveyor strip and a sheave about which a cable which effects the extension of the conveyor strip is passed before returning to a drum coaxial with the conveyor strip actuating drum.

Referring first to Fig. 23, it will be observed that a base 330 is provided with three pedestals 331, 332 and 333, each of these being appropriately secured to the base. The pedestal 333 is formed as a gear housing 334 and has bolted to it a partition member 335 which provides bearings for some of the gearing and a hollow closure plate 336, and to this closure plate 336 there is appropriately secured by a flange 337 a motor 338. A motor shaft 339 carries a fly wheel 340 and in alinement with the latter a driving pinion 341, which meshes with much larger gears 342 journaled in bearings in the plate 335 and in the pedestal 333. Coaxial and integral with the gears 342 are pinions 343 which in turn drive a large gear 344 secured to a shaft 345, the hub 346 of the gear 344 being journaled in a ball bearing 347 carried by the pedestal and thus providing a rotatable support for the shaft 345. The gear casing or pedestal 333 has pivotally connected to it jacks J1, J1 which are extensible and have pads 350 which may be forced into engagement with the mine roof. Similar jacks J2, J2 are associated with the pedestal 331, as shown in Fig. 26. The shaft 345 is journaled also in bearings 351 enclosed in a chamber 352 in the pedestal 331. The shaft has rotatably supported upon it near the gear casing a drum 355 which is supported by bearings 356 upon the shaft. This drum has a brake surface 357 upon it and a brake band 358 held against rotary movement by a pin connection 359 with the pedestal 333 is tightenable and releasable by a hand wheel mechanism 360, and when the brake band is tightened the drum 355 is held against rotation. The drum can be caused to rotate with the shaft when a pin clutch 362 has its clutch pins 363 received in recesses 364 formed in the drum, as indicated in Fig. 23. The clutch 362 has an annular groove 365 formed in it into which there extend shipper elements 366 carried by arms 367 projecting from a rotatable shaft 368 mounted in the pedestal 332. A hand lever 370 can rotate the shaft 368 to effect engagement and disengagement of the pin clutch.

A hollow drum 371 is journaled by bearings 372 and 373 on the shaft 345 and has wound on it a conveyor strip 375 whose "free" end is connected at 376 to a heavy spring 377 whose other end is connected to the end of a cable 378 which passes around a jack supported sheave 379 and back to the drum 355. Bars 380 extend within the hollow interior of the drum and have connected to them alternate ones of a series of friction discs 381, and the others of this series of discs are connected by spline grooves 382 formed in the shaft 345 in the portion of the latter which is within the interior of the drum 371. A clutch applying sleeve 383 is normally pressed by a spring 384 against the adjacent clutch disc in such a manner as to load the clutch, the other end of the spring resting against a support 385 within the drum. The shaft is traversed by a transverse opening 386, and a cross bar 387 extends through this opening and through openings 388 in the sleeve 383 and may be moved by a thrust rod 389 to overcome the pressure of the spring 384 and to remove the pressure from the clutch discs. The rod 389 extends through a bore 390 in the left hand end of the shaft 345 and at its end engages one (391) of a pair of relatively rotatable discs 391, 392, the other of which discs, 392, is spaced from the disc 391 by an anti-friction bearing 393 and at its remote end is pivotally connected as at 394 to a fork 395 pivotally connected at 396 to a bell crank lever 397 in turn pivotally supported at 398 on a fork-like bracket 399 extending outwardly from the pedestal 331. The free end of the bell crank lever extends at 400 into a slot 401 in a bracket 402, herein shown as integral with the upper portion of the pedestal 331, and a hand wheel 403 and a screw 404 are provided for the purpose of applying pressure to the free end 400 of the bell crank lever 397 when it is desired to remove the pressure from the clutch discs 381 for a substantial period. An annular cam support member 405 is secured to a reduced end 406 of the shaft 345, and is provided with a plurality of openings 407 at appropriate intervals about a peripheral flange portion 408 thereof. These openings are adapted to receive as at 409 the journals for cam rollers 410, or there may be elongated cams clamped to the flange 408 if desired. Upon the end 411 of the bell crank 397 there is journaled a roller 412 which is engageable by the cam rollers 410, or their equivalents.

The cable 378 may be used for the purpose of moving the base 330 to change the position of the apparatus just described. There may be provided, for example, an inclined sheave 415 so arranged as to permit the cable 378 to be passed from the drum 355 over this sheave. This cable may then be led to a sheave 416 on a jack-held base 417 and then around another sheave 418 on this same base 417 and back to a hook 419 secured to the base 330. Thus the base can be moved longitudinally toward the jack-held base 417. A similar jack-held base 417' can be arranged at the other end of the base 330 and be similarly utilized for changing the position of the base and the supported parts. Desirably, the hook 419 may be made double so as to permit the cable to be attached to it conveniently from either direction. The conveyor strip 375 in the construction illustrated is arranged to discharge on to a similar receiving conveyor strip 375' which may be similarly actuated. Obviously the receiving conveyor may be of any suitable form.

It is also to be noted that the conveyor strip 375 is elevated above the mine bottom as is the sheave 379, and there will shortly be described suitable supporting means for guiding and supporting the conveyor strip in this elevated position.

The mode of operation of the embodiment just described will be readily understood. The amplitude of reciprocation of the strip 375 will be determined by the effective diameter of the roll of strip on the drum 371 at any given moment. If this roll is large, the angle of movement before the clutch discs 381 are unloaded should be comparatively small. The arrangement of the cam means which coacts with the roller 412 can be predetermined to take care of this factor. The reduction gearing generically illustrated will be chosen so as to provide for the proper frequency of the shaker or jigging movement of the conveyor. The free end, so-to-speak, of the strip 375 and the spring 377 may be moved to the right by engaging the pin clutch 362 at appropriate times.

This embodiment of the invention is very effective. The use of the simple tension spring 377 with the cable means for adjusting its position and tension provides an excellent arrangement. The apparatus is ideal for the purpose of getting supplies such as timber to the working face. Supplies may be loaded on the strip 375 when all but a small portion has been wound up on the associated drum, and then the cable 378 may be employed to extend the conveyor strip and thus move the supplies up to the face. This cable provides a convenient means also, and indeed this is its primary function, of retracting and advancing the conveyor strip to and from the working face; and, upon the completion of a normal cut, the repositioning of the conveyor strip along the new face. It will be noted that the device includes a pin clutch actuated, brake held rope drum and a multiple disc clutch driven belt drum. It will be noted that the cam mechanism for determining the loading of the friction discs 381 rotates always in one direction. The clutch of the belt drum is spring loaded by the spring 384 sufficiently to cause the drum to pull the strip outwardly under the heaviest load condition to be encountered. The clutch releasing lever 397 is actuated by an adjustable timing cam or its equivalent, the period of release depending, in the arrangement illustrated, on the number of cam rollers 410 employed. A number of clutch releases and reapplications are possible in a single rotation of the shaft 345. For example, by using three rollers 410, properly spaced, three strokes per revolution may be obtained. As the clutch is applied during the leftward movements of the conveyor strip 375 in Fig. 28, it will be evident that the employment of four cam rollers 410 equally spaced will result in shorter load-moving strokes, and the shortening of the load-moving strokes of course shortens also the movements in which the conveyor strip 375 slips beneath its load. As previously noted, the hand wheel 403 may be operated in a manner to effect continuous disengagement of the clutch discs 381 and thus a complete interruption of loading operation. It may be noted that the belt is anchored to the drum by slots S as shown in Fig. 25.

The several embodiments of the invention so far described are adapted to self-loading, hand loading or to receive material from mechanical loading equipment. They have not been shown in association with such equipment, and in some of the remaining figures of the drawing there are shown arrangements in which loading machines having respectively high and low discharges are more or less diagrammatically illustrated.

Referring first to Fig. 30, it will be observed that there is diagrammatically shown at L a loading machine having gathering devices diagrammatically shown at 420 for collecting shot coal illustrated at C in Fig. 30, and delivering it to a delivery conveyor mechanism 421 which delivers the collected coal to a trough-like receiving pan or box 422 to which the forward end of the conveyor strip is attached. This receiving box or trough section 422 may be guided on the body of the loading machine L or in any other suitable manner, and as shown in Fig. 30 it is so guided, and the spring means 377, which is associated with it, is hooked to a connection 423 connected to the box 422 and to an eye 424 fastened to the top of the loading machine. Between the rear end of the loading machine and the actuating device for the strip 375 there may be a considerable distance, and this distance will increase from a relatively short one to a very considerable one as the loading out operation is carried on. Accordingly, means must be provided for supporting the conveyor strip 375 at suitable points between the rear of the loading machine L and the mechanism supported by the base 330. In Fig. 32 a suitable extensible jack 425 is shown on which a bracket 426 is supported and is adapted to be clamped at an appropriate height by a clamp 427. The bracket 426 supports a bearing structure 428 for three rolls 429, 430 and 431 upon which the strip 375 rests, and by reason of the relative disposition of the rolls the conveyor strip will be troughed, as shown in Fig. 32. If it be desired to do so, and particularly if the width of the strip 375" to be used is considerable, instead of using a single jack 425 with the bracket 426 projecting from it, there may be provided a transverse support 435 (see Fig. 33) upon which bearing means 436 for three rolls 429', 430' and 431' may be mounted, and the support 435 may have at its opposite ends clamps 440 and 441 by means of which it can be held to extensible jack pipes 442 and 443. With the arrangement mentioned, a very effective support and guidance of the conveyor strip will be secured, and there will be a considerable reduction in friction, as compared with the result which would follow guiding the strip on the mine bottom, a procedure which is shown in some of the constructions already illustrated but which is not necessary even with a low run of the low position of the conveyor strip.

In Fig. 34 there is shown an arrangement for use with a low loading machine L1. This machine has a gathering mechanism 450 for taking shot coal as at 451 and moving it to a delivery conveyor 452 whose rearward end overhangs a receiving box 453 to which the front end of a conveyor strip 375''' is connected in material-receiving relation. The loading machine L1 may be provided with front and rear pairs of jacks J4, J4 and with fluid pressure operated feeding means diagrammatically illustrated at 455, this apparatus serving, when the rearward jacks J4 are set, to feed the loading machine L1 forward, and, when the forward jacks J4 are set, to bring up the rearward jacks J4 into position for the initiation of another forward feeding movement. Like arrangements may be employed with the apparatus of Fig. 30. The spring 377'' is connected at 456 with the receiving box 453 and at 457 to the base of the loading machine L1. With this form of construction the loading strip 375''' may rest on the mine bottom or may be provided with guides supporting it out of contact with the mine bottom. In Fig. 38 the strip 375[4] is shown with its edges slightly curved and as sliding directly on the mine bottom. In Fig. 37 the strip 375[5] is shown as slidable and supported by the dished top 458 of a guide structure 459 formed of light plate or the like and having legs or feet 460 engaging the mine bottom. In this arrangement the upper surface of the guide structure may have areas thereof faced with a good anti-friction metal by the use of a metal spraying machine. In Figs. 35 and 36 a more complex arrangement is illustrated, in these figures rollers 429'', 430'' and 431'' being supported on generally triangular bases 461 having adjustable feet 462, 463 and 464 arranged at the apexes of a triangle so that the bases 461 can be levelled up. In this form the conveyor strip 375[6] is slightly dished by the load. This form of construction has the definite advantage over the constructions of Figs. 37 and 38 in that not only is there a large reduction in friction and wear as compared with Fig. 38 but also a considerable reduction in friction and wear as compared with Fig. 37.

As in other embodiments, the feeding mechanism of the loading or mining machine 420 or 450 may be employed to effect unwinding of the conveyor strip from its drum, as the machine is advanced toward the work. Also, the winding drum may be employed to wind in the conveyor strip to effect retraction of the loading or mining machine from the work.

Certain procedures for strip extension have been described in the course of the foregoing material. It will be appreciated, however, also, that it is possible to effect extension of the working length of the strip during the actual loading operation. This can be readily understood since it will be observed that, during a portion of each complete cycle including opposite movements of the strip, the friction clutch will not be loaded at all or will be loaded insufficiently to effect reel drive, and during these periods an extension of the strip will be possible. It will be appreciated that the nature of the clutch-loading process is such that, until the load applied to the interleaved clutch discs reaches a point at which driving engagement takes place, there may be a pulling of strip from the reel even while forces adapted to drive the reel in a winding up direction are in the process of being built up. To restate the matter, the periods during which the strip will be pulled to the left in the various figures showing it extended are determined by the duration of the application of forces above a certain value to the friction clutches and, during the periods when the forces are below that value, it will be evident that extension will be possible while the material moving operation continues to take place provided extension-effecting forces are being exerted.

Throughout the drawings, it may be noted that variations from the relative proportions shown may be effected in the practice of my invention without departing from it.

The conveyor strip may assume many forms within the scope of my invention, but an arrangement with the sides turned up as shown in Fig. 35 is perhaps preferable not only to a flat strip, but also to a merely dished or concave one.

In both of the arrangements of Figs. 30 and 34 an inclined slide board or chute 470 may be used to extend to a belt conveyor 471 and to take the material off of the top of the coil of conveyor strip and feed it to the belt conveyor 471. This discharge chute may be supported in any suitable manner, and it has not been thought necessary to illustrate this arrangement.

In the several illustrative embodiments of the invention in its broader aspects and in the adjuncts, or better components, of the invention which have been illustrated, it will be appreciated that I have provided in all cases a thoroughly efficient substitute for conventional shaker conveyor drives, each having resilient means, mechanical or fluid pressure, for effecting the relatively rapid sharply accelerated movements of a flexible conveyor strip, each utilizing a drum device though the invention is not limited thereto, for providing the opposite slower and more uniform movements of the conveyor strip, and each including means by which the force available for the rapid forward movements of the conveyor strip may be adjusted, and each utilizing the slower movements for causing the material being handled to move towards a point of discharge and build up energy for the opposite movements of the conveyor strip.

This application is a continuation-in-part of my applications, Ser. No. 642,186, filed January 19, 1946 and now abandoned and Ser. No. 725,950, filed February 1, 1947.

While there are in this application specifically described three forms and various modifications and adjuncts which my invention may assume or employ in practice, it will be understood that these forms and modifications and adjuncts of the same are shown for purposes of illustration and that the invention may be further modified and embodied in various other forms without departing from its spirit or the scope of the appended claims.

What I claim as new and desire to secure by Letters Patent is:

1. In a conveyor means, the combination comprising a flexible conveyor band having a portion supported for reciprocatory movement for conveying material therealong, and means for reciprocating said conveyor band portion with a shaker conveyor motion and for extending the free length thereof while the band portion continues to be reciprocated with a shaker conveyor motion including drums operatively connected with said band portion at the opposite ends thereof.

2. In combination, in a shaker conveyor, a flexible load-conveying strip capable of being closely rolled upon a drum and drawn off the drum to provide a widely variable material-supporting length over and along which material can be caused to travel by the transmission to such strip of a shaker conveyor motion including short movements of such strip length in one direction with supported material moving with it, and intermediate movements in the other direction with sliding of such strip length under the supported material, such movements substantially equal though opposite and short as compared with the travel of the material between its point of reception and its point of discharge, a drum to which said strip is connected and on which a portion thereof is wound, means for automatically repetitively moving said drum to effect movement of such strip length in one of said directions and as aforesaid, and means including a resilient energy-storing device to which the end of such strip remote from the drum is connected for moving such strip length in the opposite direction as aforesaid between each consecutive pair of movements effected by drum movement.

3. In combination, a flexible conveyor strip for moving material according to the shaker conveyor method and having a material supporting and conveying length along which material is moved as a result of rapidly repeated short tractions of the strip in the direction in which material movement is sought and of such a nature that the material derives movement from the strip longitudinally of the latter, there being between each such traction and the next an opposite traction of such a nature that the strip is caused to slide beneath the material thereon in a direction opposite that of desired material movement, said strip of such a nature that it buckles if in an unloaded condition it be attempted to move it by a push applied to its instantaneously rearward end rather than a traction at its forward end sufficient to maintain it at least free of longitudinal compressive forces, a reel, said strip including also a portion at one end of such length normally wound on said reel and adapted to be pulled off of the latter to extend the working length of the strip, means connected with the other end of such length for receiving and storing energy when the strip is moving in a direction away from it and adapted to expend such energy in pulling the strip in an opposite direction, a motor, and means driven by said motor for moving said reel as above described to effect rapidly alternately a traction on the strip in the direction in which material movement is sought and an opposite traction upon said strip to pull the latter in the opposite direction.

4. In combination, a flexible conveyor strip for moving a load according to the shaker conveyor method and having a material supporting and conveying length along which material is moved as the result of rapidly repeated strip movements in one direction, during which the material moves with said length, spaced by intermediate strip movements in the other direction during which sliding of said length beneath its load occurs, and means for imparting movements as aforesaid to such material supporting and conveying length including a reel on which a portion of said strip is wound and from which said strip may be pulled off to increase its material supporting and conveying length, means for repetitively moving said reel to move said length of strip repetitively in one direction a distance which is a small fraction of such length, and means exerting traction upon such length of strip at a point remote from said reel to move it equidistantly in the other direction between each pair of movements effected by said repetitive movement of the reel.

5. In combination, a flexible conveyor strip for moving the load thereon step by step toward discharge according to the shaker conveyor method and having a material supporting and conveying portion along which material is moved as the result of a shaking motion imparted to the strip, said strip being of such length and nature that buckling would occur if longitudinal compressive forces were applied to it and variable in effective length during its operation, and means for imparting a shaking motion to said strip to effect conveying of a load thereon toward discharge including a motor and means respectively driven by and energized by said motor for imparting to said supporting and conveying portion of said strip continued reciprocatory motion made up of opposite travels of like length, one at a relatively low mean speed in one direction and the next at a relatively higher mean speed in the opposite direction, the maximum velocity in said last mentioned direction enabling said strip to slide beneath its load of material, and means associated with said strip for varying the effective length of its supporting and conveying length while the reciprocatory conveying function of the strip continues.

6. The combination as set forth in claim 5 wherein said means for varying the effective length of the supporting and conveying portion of said strip comprises means on which a portion of said strip is stored and from which said stored portion may be drawn during the shaking operation.

7. The combination as set forth in claim 6 wherein said storing means for said strip portion comprises a reel on which the strip portion is wound and from which said strip portion may be unwound to increase the effective length of its conveying portion, and in which said means for imparting shaking motion to said strip comprises motor operated means and motor energized means for respectively moving said reel alternately oppositely to cause motion of the effective conveying portion of such strip as set forth.

References Cited in the file of this patent

UNITED STATES PATENTS

| Number | Name | Date |
|---|---|---|
| 895,776 | Liggett | Aug. 11, 1908 |
| 1,234,495 | Sargent | July 24, 1917 |
| 1,532,228 | Carpenter | Apr. 7, 1925 |
| 1,582,411 | Lesser et al. | Apr. 27, 1926 |
| 1,591,041 | Howell | July 6, 1926 |
| 1,593,731 | Stebbins | July 27, 1926 |
| 1,818,771 | Weitz | Aug. 11, 1931 |
| 1,821,644 | Jones | Sept. 1, 1931 |
| 1,838,190 | Robbins | Dec. 29, 1931 |
| 1,970,842 | Crossen | Aug. 21, 1934 |
| 2,043,747 | Getty et al. | June 9, 1936 |
| 2,093,568 | McFarland | Sept. 21, 1937 |
| 2,126,240 | Bergh | Aug. 9, 1938 |
| 2,170,504 | Messer | Aug. 22, 1939 |
| 2,225,666 | Simmons | Dec. 24, 1940 |
| 2,422,053 | Tibbals | June 10, 1947 |
| 2,481,131 | Lindsay | Sept. 6, 1949 |

FOREIGN PATENTS

| Number | Country | Date |
|---|---|---|
| 191,538 | Great Britain | Jan. 18, 1923 |
| 492,525 | Great Britain | Sept. 19, 1938 |
| 541,444 | Germany | Jan. 15, 1932 |